(12) United States Patent
Alwala et al.

(10) Patent No.: US 11,936,325 B2
(45) Date of Patent: Mar. 19, 2024

(54) COMPENSATION FOR HISTORICAL ERROR IN DYNAMIC OBSERVER-BASED RIPPLE DETECTION IN BRUSHED DIRECT CURRENT MOTORS

(71) Applicant: Texas Instruments Incorporated, Dallas, TX (US)

(72) Inventors: Kaushik Alwala, Nalgonda (IN); Venkata Naresh Kotikelapudi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 9 days.

(21) Appl. No.: 17/680,577

(22) Filed: Feb. 25, 2022

(65) Prior Publication Data
US 2023/0253899 A1     Aug. 10, 2023

Related U.S. Application Data

(63) Continuation-in-part of application No. 17/592,921, filed on Feb. 4, 2022.

(51) Int. Cl.
*H02P 1/46* (2006.01)
*H02P 1/50* (2006.01)
(Continued)

(52) U.S. Cl.
CPC ........ *H02P 7/0094* (2013.01); *H02P 2207/05* (2013.01)

(58) Field of Classification Search
CPC .................................................... H02P 7/0094
(Continued)

(56) References Cited

U.S. PATENT DOCUMENTS 6,456,028 B2 *  9/2002  Aoki ..................... H02P 7/0094
                                                    318/470
8,169,178 B2 *  5/2012  Letor ........................ H02P 7/28
                                                    318/632
(Continued)

OTHER PUBLICATIONS

"DRV870x-Q1 Automotive H-Bridge Gate Driver," Datasheet SLVSDR9E (Texas Instruments Incorporated, Jan. 2021).
(Continued)

*Primary Examiner* — Erick D Glass
(74) *Attorney, Agent, or Firm* — John R. Pessetto; Frank D. Cimino

(57) ABSTRACT

A motor control system and method for a brushed direct current (BDC) motor using a compensated and corrected ripple count. Motor control circuitry, for example implemented in digital logic such as a microcontroller, receives a coil current signal and a motor voltage signal. Discontinuities in the coil current signal, are counted to generate a ripple count. An observer function derives an angular frequency model estimate using a computational model for the motor applying motor parameters estimated in an initial estimation interval following startup of the motor. A corrected ripple count is generated based on a comparison of a commutation angle of the motor with an angular position based on the angular frequency model estimate. Compensation for cumulative error over the initial estimation interval is derived from a behavioral motor model applying the estimated motor parameters. A motor drive signal is adjusted based on the compensated corrected ripple count.

19 Claims, 13 Drawing Sheets

(51) Int. Cl.
*H02P 3/18* (2006.01)
*H02P 7/00* (2016.01)

(58) Field of Classification Search
USPC .......................................................... 318/721
See application file for complete search history.

(56) References Cited

U.S. PATENT DOCUMENTS

| | | | |
|---|---|---|---|
| 9,628,006 | B2 | 4/2017 | Hernandez et al. |
| 10,075,107 | B2 * | 9/2018 | Lepka ........................ H02P 6/18 |
| 11,070,151 | B2 * | 7/2021 | Jordan ...................... B60N 2/12 |
| 11,463,030 | B2 * | 10/2022 | Jordan ....................... H02P 6/18 |
| 11,757,921 | B2 * | 9/2023 | Grabois ................ G06F 21/552 |
| | | | 726/25 |
| 2023/0259898 | A1 * | 8/2023 | Mathai ................... G06Q 30/06 |
| | | | 705/39 |

OTHER PUBLICATIONS

"Mixed Signal Microcontroller," Datasheet SLAS735J (Texas Instruments Incorporated, 2013).

Chotai, et al., "Modelling and Position control of Brushed DC motor," 2017 International Conference on Advances in Computing, Communication and Control (IEEE, 2017), pp. 1-5.

"DRV8212 11-V H-Bridge Motor Driver with Pwm, PH/EN, and Half-Bridge Control Interfaces and Low-Power Sleep Mode," Datasheet SLVSFY9B (Texas Instruments Incorporated, Aug. 2021).

Hossfeld, et al., "Analysis of DC Motor Current Waveforms Affecting the Accuracy of 'Sensorless' Angle Measurement," Trans. Instrumentation & Meas., vol. 70 (IEEE, 2021), 7500908.

Knezevic, "Low-Cost Low-Resolution Sensorless Positioning of DC Motor Drives for Vehicle Auxiliary Applications," Trans. Vehic. Tech., vol. 62, No. 9 (IEEE, 2013), pp. 4328-4335.

Yolacan et al., "Real Time DSP Based PID and State Feedback Control of a Brushed DC Motor," 2011 XXIII International Symposium on Information, Communication and Automation Technologies (IEEE, 2011), pp. 1-6.

\* cited by examiner

COMPENSATION FOR HISTORICAL ERROR IN DYNAMIC OBSERVER-BASED RIPPLE DETECTION IN BRUSHED DIRECT CURRENT MOTORS

CROSS-REFERENCE TO RELATED APPLICATIONS

This application is a continuation-in-part of copending U.S. application Ser. No. 17/592,921, filed Feb. 4, 2022, which is incorporated herein by this reference.

STATEMENT REGARDING FEDERALLY SPONSORED RESEARCH OR DEVELOPMENT

Not applicable.

BACKGROUND

This specification relates to measurement and control circuitry for brushed direct current (BDC) electrical motors. More specifically, this specification relates to the measurement of motor speed and position of BDC motors.

Direct current (DC) motors are commonly used in a wide range of applications requiring the conversion of electrical energy into mechanical torque. As fundamental in the art, a DC motor generates mechanical torque from the rotation of an electromagnetic rotor in a magnetic field in response to current applied to the rotor coil. Commutation of the coil current reverses the direction of the current through the rotor windings as the rotor rotates through the magnetic field, thus maintaining torque in the same angular direction. In brushed DC motors, coupling of the DC current to the rotor is made by brushes that contact a commutator at the rotor shaft; gaps in the commutator prevent short circuiting as the coil current is reversed.

BDC motors have a long history and continue to have widespread use in many modern implementations due to their simplicity, ease of adjustable control, and utility in both low power and high power applications. For example, modern automobiles commonly use BDC motors for such functions as power windows, HVAC control, seat positioning, mirror adjustment, windshield wipers, electronic shifters, and the like. BDC motors are also widely used in industrial applications including pumps, fans, robots, camera and other positioners, and hospital beds, to name a few.

In many of these BDC motor applications, accurate control of the speed and position of the rotor, and thus of the motor shaft, is important. Modern BDC motor applications often include a microcontroller programmed to operate and control the motor in response to user input or program control, by providing drive signals to a DC motor driver to attain the desired speed or position. In closed-loop motor control implementations, feedback regarding a current speed or position (or both) of the motor is applied in a control loop to attain precise and stable operation of the motor. Accurate closed-loop control depends on the accuracy at rotor speed and position is measured.

One conventional approach to speed and position measurement in closed-loop BDC motor control uses a sensor, such as a tachometer, optical digital quadrature encoder, Hall-effect positional sensor, rotary sensor, or other position sensor installed on the rotor. Such encoders and sensors convert an indicator of the rotational speed, direction, and position of the rotor into digital signals communicated to the microcontroller or other motor control logic. However, such encoders and sensors add significant cost and complexity to the motor system.

BRIEF SUMMARY OF THE INVENTION

To avoid the cost and complexity of encoder-based or sensor-based measurement in BDC motor systems, motor position and speed can be measured by counting ripples in the armature coil current or back electromagnetic force (back emf) that occur from commutation. By counting the number of ripples over a time interval, one can derive the rotational speed of the BDC motor.

It is within this context that the embodiments described herein arise.

According to one aspect, a motor control method for driving a BDC motor is performed. In an initial time interval following startup of the motor, an estimate of motor parameters is generated responsive to a sensed motor voltage and a sensed angular velocity of the motor. Discontinuities detected in a sensed coil current are counted to produce a ripple count over this initial time interval A computational model applying the estimated motor parameters is used with the sensed coil current and motor voltage to determine an angular frequency model estimate from which an estimated rotation is derived and compared with a commutation angle of the motor. A corrected ripple count is generated responsive to the comparison, for use in adjusting a drive voltage applied to the motor. The corrected ripple count is compensated for cumulative error based on an historical angular frequency model estimate generated from a behavioral motor model incorporating the estimated motor parameters.

According to another aspect, a motor control system including motor control circuitry, for example digital logic circuitry such as a microcontroller, is provided. The motor control circuitry is configured to estimate of motor parameters is generated responsive to a sensed motor voltage and a sensed angular velocity of the motor in an initial time interval following startup of the motor, and generate a motor drive signal by detecting and counting discontinuities to produce a ripple count. An angular frequency model estimate is determined using a computational model for the motor, and in response to a coil current signal and a motor voltage from the motor. Results of a comparison of an angular position based on the angular frequency model estimate with a commutation angle of the motor to produce a corrected ripple count for use in adjusting the motor drive signal. The corrected ripple count is compensated for cumulative error based on an historical angular frequency model estimate generated from a behavioral motor model incorporating the estimated motor parameters.

Technical advantages enabled by one or more of these aspects include improved accuracy in measuring the rotational position of the motor by compensating for error in the ripple count arising during an initial time period in which motor parameters are being estimated from operation of the motor. This improved accuracy enables integration of position estimation in an integrated circuit, without requiring external sensors and encoders to measure motor speed and position.

Other technical advantages enabled by the disclosed aspects will be apparent to those of ordinary skill in the art having reference to the following specification together with its drawings.

BRIEF DESCRIPTION OF THE SEVERAL VIEWS OF THE DRAWING

The same reference numbers or other reference designators are used in the drawings to illustrate the same or similar (in function and/or structure) features.

DETAILED DESCRIPTION OF THE INVENTION

The one or more embodiments described in this specification are implemented into motor control circuitry for brushed direct current (BDC) motors as it is contemplated that such implementation is particularly advantageous in that context. However, it is also contemplated that aspects of these embodiments may be beneficially applied in other applications. Accordingly, it is to be understood that the following description is provided by way of example only and is not intended to limit the true scope of this invention as claimed.

Figure 1A:
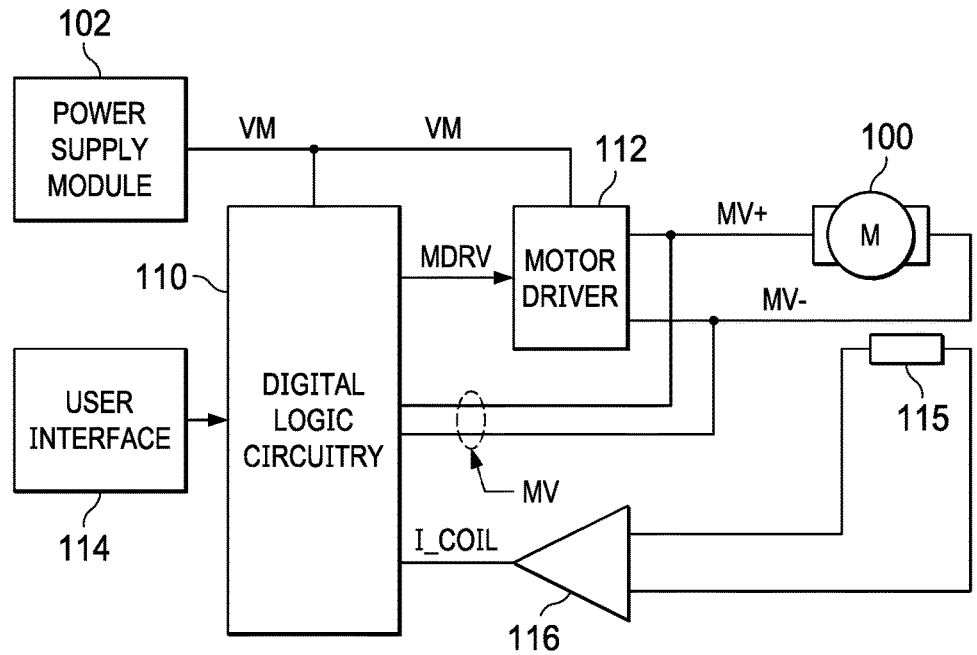
FIG. 1A is an electrical diagram, in block form, of a motor control system according to example embodiments.

FIG. 1A illustrates the architecture of a motor control system for controlling the operation of BDC motor 100 according to one or more example embodiments. In the architecture of FIG. 1A, motor control circuitry, realized as digital logic 110 in this example, generates motor control signals applied to a control input of motor driver 112 via one or more control lines MDRV. Motor driver 112 drives a voltage across and current through drive lines MV+, MV−, which are coupled to opposite ends of a coil in motor 100. In this example, as typical in BDC motor control systems, the rotational position and speed (i.e., the angular rotation and frequency, respectively) of motor 100 correspond to the coil voltage and current, with the angular frequency of motor 100 increasing with increases in the motor voltage (e.g., the differential voltage between lines MV+, MV−) and coil current driven by motor driver 112. The system of FIG. 1A also includes power supply module 102, which receives one or more external power supply voltages, and generates or communicates one or more power supply voltages, including power supply voltage VM to motor driver 112 and digital logic 110 in this example.

Motor driver 112 may be constructed as power transistors, for example arranged in an H-bridge, that apply a voltage and current derived from power supply voltage VM at lines MV+, MV− in response to a control signal from digital logic 110 communicated on line MDRV. Examples of motor driver 102 suitable for implementation according to this example embodiment include the DRV8702-Q1 and DRV8703-Q1 H-bridge gate drivers available from Texas Instruments Incorporated.

In this example, digital logic 110 applies the control signal to motor driver 112 on line MDRV based in part on feedback from motor 100. In this example embodiment, current sensor 115 is deployed in or near one (or both) of drive lines MV+, MV− to sense the coil current conducted by the coil of motor 100. Current sensor 115 may be realized as a small resistor or field-effect transistor in series with motor 100 and one or both of drive lines MV+, MV−, or alternatively may be a current sensing coil or Hall effect sensor placed near a conductor in the motor drive loop. Current sense circuitry 116 has an input coupled to receive a voltage or current level from sensor 115, and has an output coupled to digital logic 110 via line I_COIL, on which current sense circuitry 116 provides a feedback signal corresponding to the coil current of motor 100. Current sense circuitry 116 may be implemented using analog circuitry (such as an amplifier), digital circuitry, a combination of analog and digital circuitry and/or any circuitry for amplifying, conditioning and/or converting the sensed signal into a signal representative of the coil current. In addition, motor drive lines MV+, MV− from the output of motor driver 112 are coupled to digital logic 110 to provide a feedback motor voltage signal MV.

The system of FIG. 1A further includes user interface 114 coupled to digital logic 110, by way of which user inputs are communicated to digital logic 110. The desired rotational speed or position of motor 100 may be controlled by digital logic 110 in response to user inputs received via interface 114. For example, a user input received at user interface 114 and communicated to one of I/O ports 236a, 236b of digital logic 110 may indicate a desired speed or position, in response to which digital logic 110 generates control signal MDRV to motor driver 112 corresponding to that desired speed or position (e.g., a specific angular position or velocity, or a profile of position or velocity over a time interval, etc.). In another example, digital logic 110 may itself be programmed with the desired motor speed or position, such that an actuation signal from a user, received via interface 114, initiates execution of an algorithm by digital logic 110 to provide control signals corresponding to the desired position, speed, and/or speed or position profile. In other examples, digital logic 110 may operate to autonomously control the position and speed of motor 100, without requiring user input as an initiating or control signal. In any case, digital logic 110 controls the position and speed of motor 100 through the drive signal on line MDRV applied to gate driver 112, based in part on the feedback coil current it receives on line I_COIL from current sense circuitry 116 and feedback motor voltage MV across lines MV+, MV−.

Digital logic 110 in this example embodiment may be realized by fixed function digital logic circuitry, field programmable logic arrays (FPLAs), application specific integrated circuit, programmable logic circuitry (such as in the form of a microprocessor or microcomputer), or as some combination of these implementation types. Examples of a type of microcontroller suitable for use as digital logic 110 in the implementation of FIG. 1A include the MSP430G2x53 and MSP430G2x13 families of mixed signal microcontrollers available from Texas Instruments Incorporated.

Figure 1B:
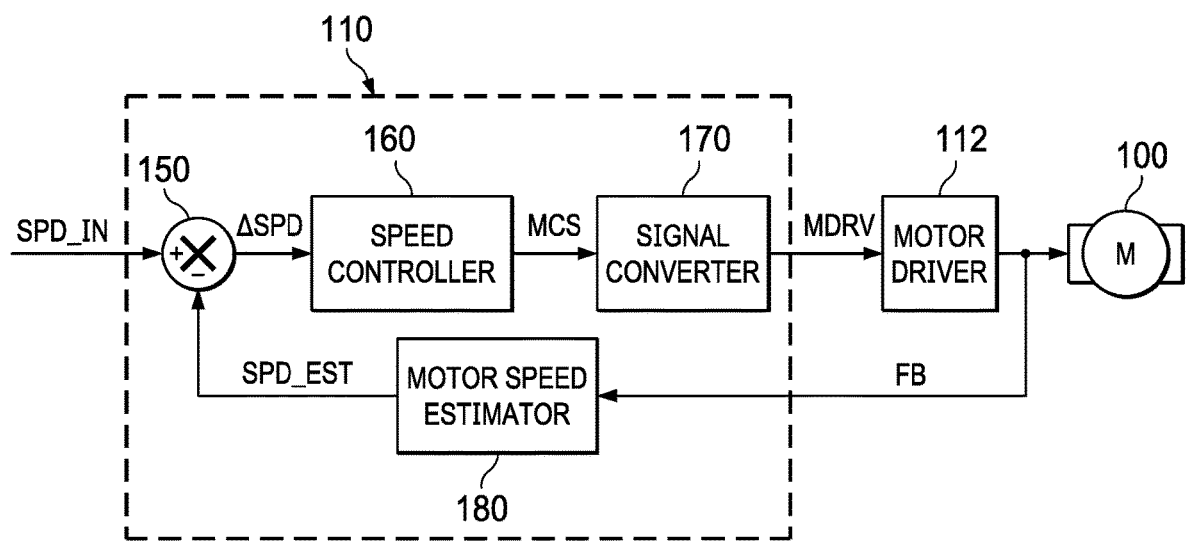
FIG. 1B is a block diagram illustrating a control loop as executed by the motor control system of FIG. 1A according to example embodiments.

FIG. 1B illustrates a control loop as implemented by the motor control system of FIG. 1A according to example embodiments. While the particular example of the control loop of FIG. 1B controls the speed (e.g., angular velocity) of motor 100 in response to feedback regarding the motor speed, it is to be understood that the control loop of FIG. 1B may alternatively control the position (e.g., angular position) of motor 100 in response to feedback regarding motor position in a similar manner.

In this example, speed input SPD_IN corresponding to a desired speed of motor 100 is received as one input to difference function 150. Input SPD_IN may be received from a user input to the motor control system, or alternatively may be a stored or calculated motor speed such as may be used in automated or autonomous motor control (e.g., in response to an actuator, such as for an automobile power window). Difference function 150 has a negative input receiving a current motor speed estimate SPD_EST as a feedback signal and operates to produce difference signal ΔSPD at its output. Difference signal ΔSPD represents a difference between the desired motor speed at input SPD_IN and the current speed estimate for motor 100 conveyed by signal SPD_EST.

Speed controller 160 receives difference signal ΔSPD and applies a control function to that difference signal ΔSPD to produce a motor control signal MCS. The control function applied by speed controller 160 includes the desired gain and filtering according to a desired response and stability characteristic. For example, speed controller 160 may be realized as a PID (proportional-integral-differential) controller with parameters selected for the desired stability and response. Speed controller 160 may be implemented using digital circuitry, analog circuitry, a processor, a microcontroller, memory, and/or software. Motor control signal MCS is applied to signal converter 170 for conversion of motor control signal MCS to a form suitable for communication to motor driver 112 as motor drive signal MDRV. For example, signal converter 170 may include a pulse-width modulator. Signal converter 170 may be implemented using digital circuitry, analog circuitry, a processor, a microcontroller, memory, and/or software. As described above relative to FIG. 1A, motor driver 112 operates to drive motor 100 with a voltage and coil current in response to motor drive signal MDRV.

In the control loop of FIG. 1B, feedback FB is measured from motor 100, for example from one or both of the motor voltage and coil current at motor 100 as driven by motor driver 112. Motor speed estimator function 180 determines the current estimated motor speed SPD_EST from this feedback FB according to example embodiments as will be described below. Estimator function 180 may be implemented using digital circuitry, analog circuitry, a processor, a microcontroller, memory, and/or software. As noted above, estimated motor speed SPD_EST serves as the feedback signal in this control loop of FIG. 1B as implemented in the motor control system of FIG. 1A. In addition, as illustrated in FIG. 1B, the control loop functions of difference function 150, speed controller 160, signal converter 170, and motor speed (or position) estimator 180 may be separately implemented, or collectively included as part of digital logic 110, according to these example embodiments.

Figure 2:
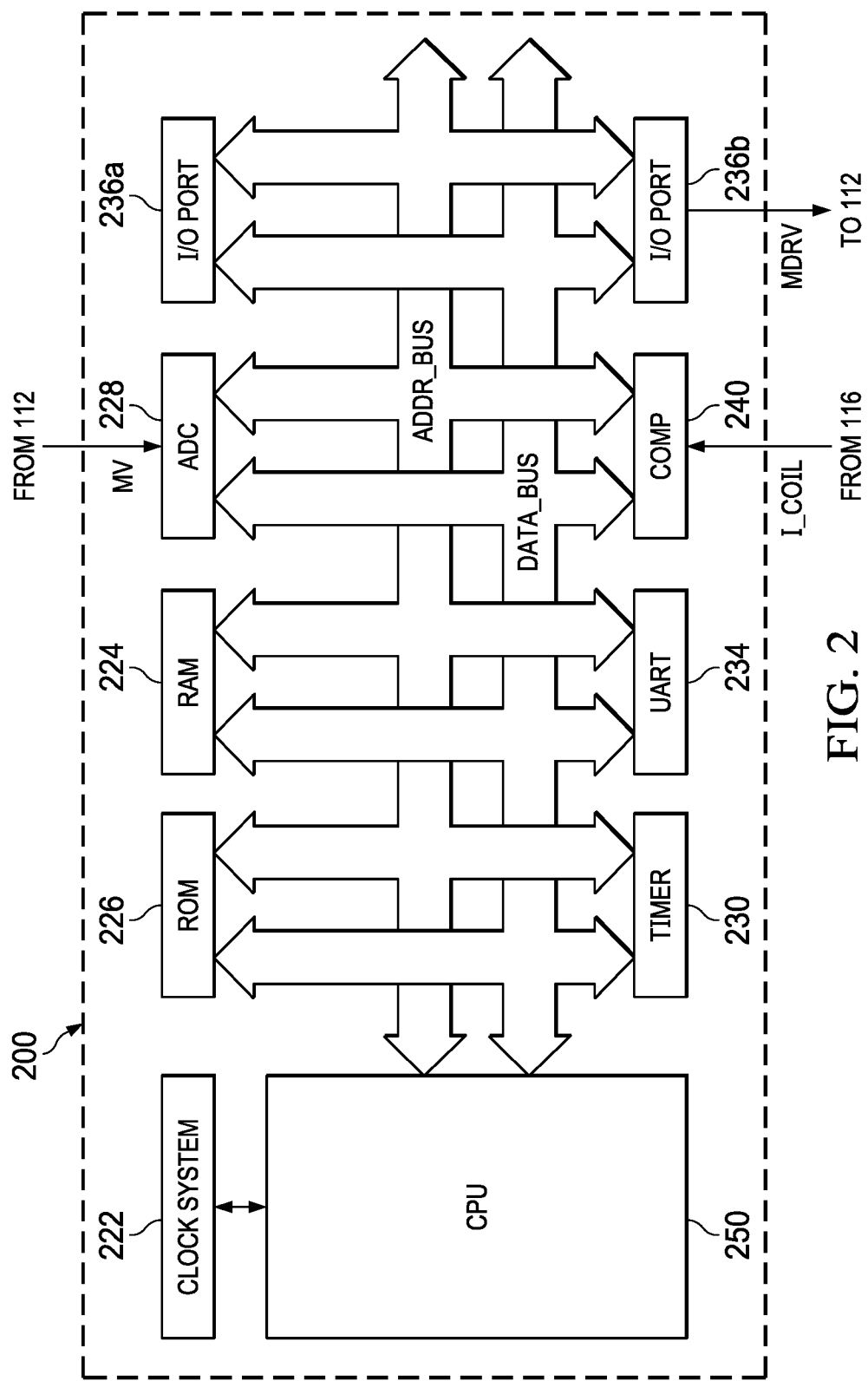
FIG. 2 is an electrical diagram, in block form, of a microcontroller in the motor control system of FIG. 1A according to an example embodiment.

FIG. 2 illustrates the architecture of digital logic circuitry 110 in the motor control system of FIG. 1A, as realized by microcontroller 200 according to an example embodiment. Microcontroller 200 in this example embodiment includes a central processing unit (CPU) 250, for example arranged as a reduced instruction set computer (RISC) architecture operating on data in a register file. In this example architecture of microcontroller 200, CPU 250 is coupled to various peripheral functional circuitry modules via address bus ADDR_BUS and data bus DATA_BUS. Clock system 222 in microcontroller 200 is shown as separately coupled to CPU 250 and is configured to generate one or more clock signals for use by CPU 250 and other functions internal and external to microcontroller 200, including one or more of the functional modules residing on buses ADDR_BUS, DATA_BUS. In the example shown in FIG. 1A, these functional modules include memory resources such as random access memory (RAM) 224 and read-only memory (ROM) 226, one or more timers 230, an analog-to-digital converter (ADC) module 228, a universal asynchronous receiver-transmitter (UART) 234, and one or more input/output (I/O) ports 236a, 236b. Other support modules such as power management, scan test functionality, and the like may also be included. Other functional circuitry modules may alternatively or additionally be implemented in microcontroller 200 as desired for the particular application. Microcontroller 200 may alternatively be realized with alternative bus architectures, with other alternative or additional functional circuitry modules, and according to other architectural variations from that shown in FIG. 2.

As shown in FIG. 2, I/O port 236b is one of the functional modules residing on buses ADDR_BUS, DATA_BUS in microcontroller 200. In this implementation, I/O port 236b has an output coupled to control line MDRV and operates to transmit motor drive signals to motor driver 112 in response to data from CPU 250. For example, microcontroller 200 may include pulse-width modulation (PWM) circuitry for producing PWM drive signals, such as produced from a control loop executed by CPU 250, for communication to motor driver 112 via I/O port 236b. Comparator 240, which also resides on buses ADDR_BUS, DATA_BUS, may be configured to perform signal comparison, such as an analog signal comparison or performing of a slope analog-to-digital (A/D) conversion. In the example embodiment of FIG. 2, comparator 240 of microcontroller 200 is coupled to receive a coil current signal I_COIL from current sense circuitry 116 for such comparison. Also in this example embodiment, ADC module 228, which also resides on buses ADDR_BUS, DATA_BUS, receives motor voltage signal MV corresponding to a differential voltage across motor drive lines MV+, MV− at motor 100.

In implementing the control loop of FIG. 1B according to this example embodiment, microcontroller 200 is programmed or otherwise configured to implement motor speed estimator function 180 to obtain a measurement of the rotational speed or position, or both, of the rotor of motor 100 for use as feedback in its control of motor 100. More specifically, microcontroller 200 obtains measurements of the speed or position of motor 100 based on core current measurements (obtained by current sense circuitry 116 from sensor 115 and communicated on line I_COIL to comparator 240) and motor voltage MV (from lines MV+, MV− at motor 100), and applies those speed or position measurements as feedback in a control loop executed by CPU 120 to generate control signals on line MDRV for application to motor driver 112.

Figure 3A:
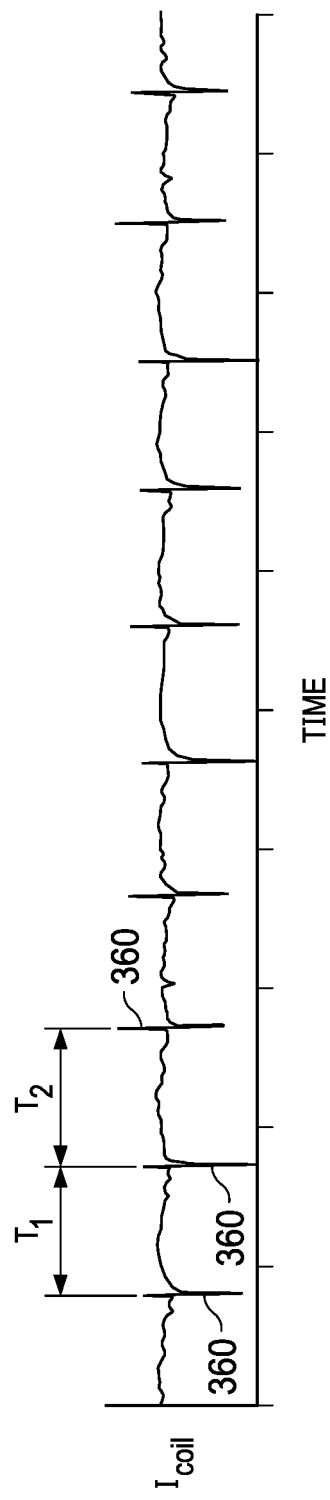
FIG. 3A and FIG. 3B are timing diagrams illustrating commutation discontinuities in coil current, and corresponding pulses as generated from the detection of such discontinuities, as used in the system of FIG. 1A and control loop of FIG. 1B according to an example embodiment.
Figure 3B:
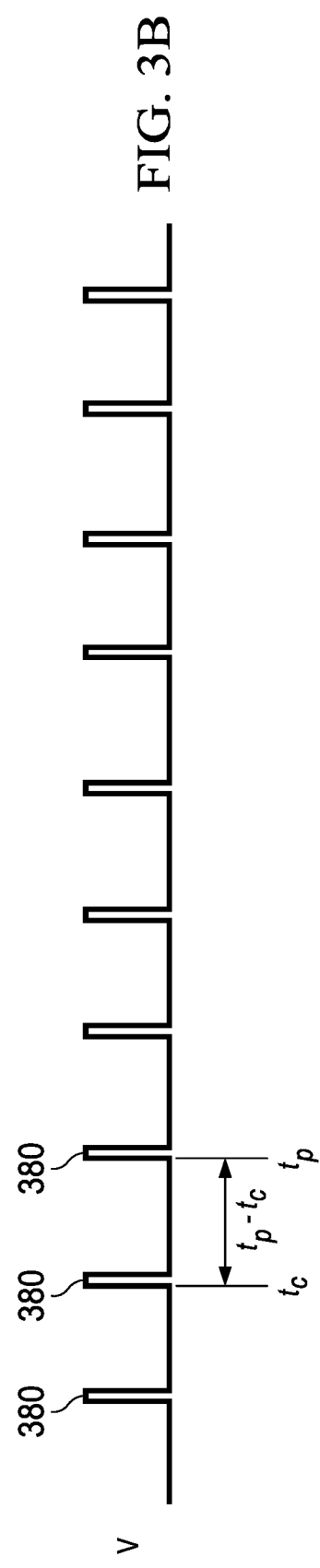

In this example, CPU 250 in microcontroller 200 is programmed or otherwise configured to determine the rotational speed or position of motor 100 from coil current measurements obtained from current sense circuitry 116 according to a "ripple counting" technique, in which discontinuities in coil current from commutation are detected and counted over time. FIG. 3A illustrates these coil current discontinuities by way of an example waveform of armature coil current $I_{coil}$ over time, for example as sensed by current sense circuitry 116. Discontinuities 360 in the waveform of FIG. 3A occur when the brushes of BDC motor 100 break contact with one commutator and make contact with the next commutator as the rotor spins. The elapsed time between adjacent discontinuities 360 (e.g., intervals $T_1$, $T_2$) is a function of the angular frequency (rotational velocity) of the motor, such that the duration of the intervals between adjacent discontinuities 360 will decrease with increases in angular frequency of the rotor. According to the ripple counting technique, the angular frequency of motor 100 can be computed from the measured time between adjacent discontinuities 360 and knowledge of the number of poles of the motor. For example, angular frequency ω, in units of rad/sec, of motor 100 can be determined from the following equation:

$$\omega = \frac{2\pi}{\sum_{i=1}^{N} \Delta T_i} \quad (1)$$

where N is the number of poles of the motor and $\Delta T_i$ is the time interval between the $i^{th}$ discontinuity in coil current between that for a given pole and that of the preceding pole. For example, as described in commonly assigned U.S. Pat. No. 9,628,006, incorporated herein by this reference, ripple counting may be realized by circuit functions including a comparator to compare a derivative of sensed coil current with a threshold level. Coil current discontinuities 360 occurring from commutation exhibit high instantaneous rates of change as shown in FIG. 3A, exceeding the threshold level (properly set) of the comparator. The comparator output may be used to trigger a one-shot multivibrator to issue a signal pulse in response to each instance of the coil current derivative exceeding the threshold. FIG. 3B illustrates a sequence of voltage pulses 380 as may be issued by such a one-shot multivibrator in response to coil current discontinuities 360 of FIG. 3A. Measurement of the time interval durations between voltage pulses 380, or conversely counting the number of pulses 380 over a given interval of time, can determine the period of rotation of motor 100 and thus the angular frequency ω of motor 100.

Errors in this ripple counting approach can appear either as missing pulses, namely the failure to detect a discontinuity in coil current (i.e., a missing or "ghost" pulse), or as false pulses erroneously generated in the absence of coil current discontinuities. Several sources of these ghost and false pulse errors in the ripple counting of BDC motor coil current have been observed in connection with these example embodiments. Transients in the coil current, such as current spikes occurring at start-up of the motor and transients resulting from load variations, braking, and reversal of motor direction, tend to distort the ripple envelope and cause ripple count errors. Another source of error results from superposition of the rotor magnetic flux that causes bending of the stator magnetic field, which can result in commutation having an undefined phase relationship and exhibiting multiple ripples per commutation. It has also been observed that the ripple peak current varies with the average coil current, such that peak detection can become difficult at lower average current levels (e.g., at low speed motor operation). Furthermore, the physical construction of the brushes in BDC motors lead to asymmetry in the ripple profile between the forward and reverse direction of rotation as the brushes shift. This asymmetry may be exacerbated with motor age, and can cause variations in the ripple envelope, and thus difficulty in ripple detection and counting.

Figure 4:
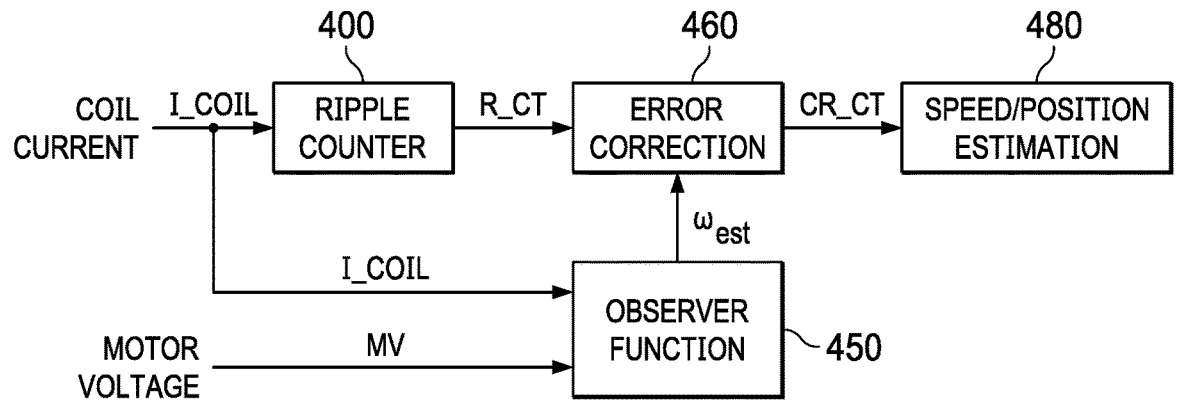
FIG. 4 is a block diagram of the functional architecture of the microcontroller of FIG. 2 in performing motor speed and position estimation according to an example embodiment.

According to example embodiments, digital logic 110 in the motor control system of FIG. 1A is configured to estimate the rotational speed or position of motor 100 based on a ripple counting approach in which ghost pulse and false pulse events may be detected and the ripple count corrected accordingly. FIG. 4 illustrates the generalized operation of digital logic 110 in estimating the rotational velocity or position, or both, of motor 100 according to one or more example embodiments. In this example described below, digital logic 110 is realized as microcontroller 200, in which case these operations will be carried out by and under the direction and control of CPU 250 in combination with other functions in microcontroller 200. For example, CPU 250 may carry out and control these operations by executing program instructions stored in machine-readable form in the memory resources of the system, such as ROM 226 and in some implementations RAM 224. Alternatively or in addition, some or all of the operations described herein may be executed by special-purpose or dedicated logic circuitry realizing part or all of digital logic 110 in the motor control system.

In the functional architecture of FIG. 4, ripple counter function 400 receives an input I_COIL corresponding to the coil current of motor 100, for example as communicated by current sense circuitry 116 to microcontroller 200 via line I_COIL. From this coil current, ripple counter function 400 operates to detect and count discontinuities in the coil current occurring from the commutation of motor 100, as the brushes of motor 100 break contact with one commutator and make contact with the next commutator during rotation, and to generate an output R_CT corresponding to a count of those discontinuities. Ripple counter function 400 may perform these operations as described in the above-incorporated U.S. Pat. No. 9,628,006, for example by comparator 240 comparing a derivative of sensed coil current with a threshold level and triggering a one-shot multivibrator to issue a signal pulse in response to each instance of the coil current derivative exceeding the threshold; pulses from the multivibrator can then be applied to a counter which outputs the ripple count R_CT. Other approaches for detecting and counting discontinuities in the coil current, or for determining the time duration between discontinuities in the coil current, may alternatively be implemented as ripple counter function 400. In any event, ripple count R_CT represents a measurement of current discontinuities occurring over time.

According to the example embodiment of FIG. 4, the coil current input I_COIL is also input to observer function 450. As in the case of ripple counter function 400, observer function 450 may be performed by CPU 250 executing program instructions stored in ROM 224 or other memory, perhaps with other functions of microcontroller 200. In addition to coil current input I_COIL, observer function 500 also receives an input MV corresponding to the voltage across motor 100. For example, input MV may correspond to the differential across motor drive lines MV+, MV− at the output of motor driver 112. As will be described in further detail below, observer function 450 applies the inputs of coil current I_COIL and motor voltage MV to a computational model of motor 100 to derive an angular frequency model estimate. In this example of FIG. 4, this angular frequency model estimate corresponds to an angular frequency or angular velocity model estimate $\omega_{est}$. Alternatively, the angular frequency model estimate derived by observer function 450 may correspond to an angular or rotational position estimate. In any case, observer function communicates the angular frequency model estimate to error correction function 460 in the architecture of FIG. 4 according to this embodiment.

In this example embodiment, error correction function 460 operates to derive an expected ripple count from the angular frequency model estimate $\omega_{est}$ produced by observer function 450 for use in correcting the ripple count R_CT as detected by ripple counter function 400 and to produce a corrected ripple count CR_CT accordingly. Corrected ripple count CR_CT is communicated to speed/position estimation function 480 implemented by microcontroller 200, for determination of a rotational velocity or position, or both, as used in controlling motor 100 (e.g., for use in updating drive signal MDRV).

As mentioned above, observer function 450 applies current measurements of coil current and motor voltage, as applied by inputs I_COIL and MV, respectively, to a model of motor 100 to obtain an angular frequency model estimate $\omega_{est}$. According to this example embodiment, the model used by observer function 450 is a system of equations including both an electrical equation and a mechanical equation for BDC motor 100. Observer function 450 arrives at angular frequency model estimate $\omega_{est}$ by solving that system of equations for angular velocity from the current values of coil current input I_COIL and motor voltage input MV. In one implementation in the continuous-time domain, the electrical equation for BDC motor 100 used by observer function 450 is:

$$v = L_a \frac{di}{dt} + I_a R_a + k_v \omega \quad (2)$$

where v is the instantaneous motor voltage, $L_a$ is the inductance (in units of Henries) of the armature coil of motor 100, I is the instantaneous coil current (in units of Amperes), $I_a$ is the time-average (e.g., RMS) of coil current, $R_a$ is the series resistance (in units of Ohms) of the armature coil of motor 100, and $k_v$ is the motor back electromotive force (back emf) constant (in units of $$\frac{V \cdot s}{rad})$$

for motor 100 such that $k_v \omega$ represents the back emf of motor 100 at angular frequency $\omega$. For purposes of this description, the terms angular velocity and angular frequency will be considered as synonymous but may be expressed in terms of different units of measure. In this implementation, the mechanical equation for BDC motor 100 used by observer function 450 is:

$$k_t I_a = J \frac{d\omega}{dt} + B_f \omega \quad (3)$$

where $k_t$ is the motor torque constant of motor 100 (in units of $$\frac{N \cdot m}{A}),$$

such that the term $k_t I_a$ represents the torque of motor 100. Motor torque constant $k_t$ is numerically equal to the back emf motor constant $k_v$ in the electrical model of motor 100, expressed in different units. J is an inertia constant) in units of kg·m²) for motor 100, and $B_f$ is a rotor friction constant (in units of kg·m²/sec) for motor 100.

As evident from equations (2) and (3), the electrical and mechanical models of motor 100 include certain constants, namely motor torque constant $k_t$, motor back emf constant $k_v$, rotor friction constant $B_f$, inertia constant J, armature coil inductance $L_a$, and armature coil resistance $R_a$. The specific values for these constants used by observer function 450 for a particular instance of motor 100 may be derived in various ways. In one implementation, observer function 450 may apply nominal values for these constants, such as may be derived from product specifications and the like. Alternatively, the values of these constants for particular instances of motor 100 may be characterized through test and measurement at manufacture or at deployment, and those characterized values stored in memory of microcontroller 200 for use by observer function 450. Alternatively, or in addition, one or more values of the model constants may be adaptively derived during the actual operation of motor 100, for example by iteratively adjusting initial values (e.g., specification values, or characterized values) during an initial time interval of each operation of motor 100.

Figure 5:
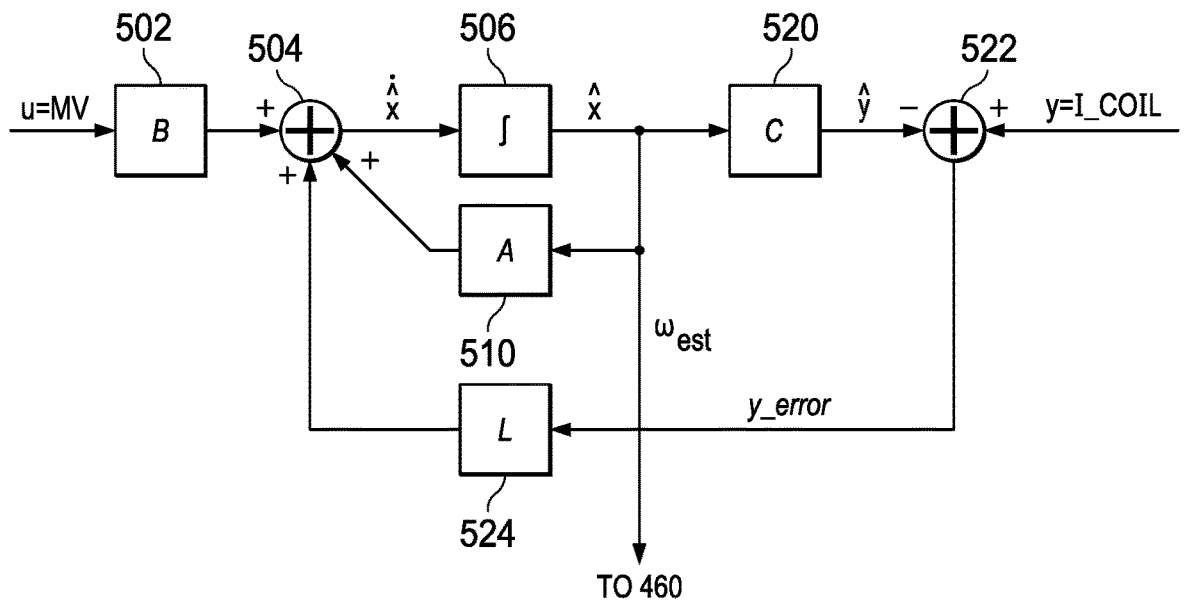
FIG. 5 is a block diagram illustrating the operation of an observer function in the functional architecture of FIG. 4 according to an example embodiment.

In a digital logic realization of observer function 450, such as implemented by CPU 250 of microcontroller 200 according to this example embodiment, the model system of the electrical and mechanical equations may be efficiently realized in a recursive implementation. FIG. 5 illustrates such a recursive implementation of the system of equations (2) and (3) in the continuous-time domain. In the recursive implementation of FIG. 5, it is useful to consider at least some of the signals and operators in the form of vectors and matrix operators, with the scalar inputs of motor voltage MV and current coil I_COIL.

In particular, the implementation of FIG. 5 is arranged to derive a model estimate output vector $\hat{x}$ representing angular frequency model estimate $\omega_{est}$ and average coil current $I_a$ as follows:

$$\hat{x} = \begin{bmatrix} \omega_{est} \\ I_a \end{bmatrix} \quad (3a)$$

To arrive at this model estimate output vector $\hat{x}$, the realization of FIG. 5 includes B operator 502 which multiplies its input u, which in this case is a scalar corresponding to the input of motor voltage MV as sensed and digitized by ADC 228 of microcontroller 200, by a matrix B:

$$B = \begin{bmatrix} 0 \\ 1/L_a \end{bmatrix} \quad (3b)$$

where $L_a$ represents the coil inductance of motor 100. The output of operator 502 is applied as one input to adder 504. As will be described below, adder 504 will generate an estimate vector that is the time derivative of model estimate output vector $\hat{x}$. That time derivative vector is applied to integrator 506, which integrates the time derivative to produce model estimate output vector $\hat{x}$. Model estimate output vector $\hat{x}$ is applied as feedback to A operator 510, which multiplies vector $\hat{x}$ by:

$$A = \begin{bmatrix} -B_f/J & k_t/J \\ -k_v/L_a & -R_a/L_a \end{bmatrix} \quad (3c)$$

The output of operator 510 is another input to adder 504. Model estimate output vector $\hat{x}$ is also applied to C operator 520, which multiplies vector $\hat{x}$ by:

$$C = [0 \ 1] \quad (3d)$$

to retrieve the current estimate of coil current $I_a$ from vector $\hat{x}$. The resulting value $\hat{y} = I_a$ is applied (as a negative term) to one input of adder 522, which receives the current measured coil current value I_COIL (i.e., $y = I_a$) at its other input. The output of adder 522, expressed as error signal y_error in FIG. 5, thus represents a time differential $\Delta I_a$ between the current estimate and current measured coil current values, and is applied to an input of L operator 524. L operator 524 multiplies error signal y_error by a gain matrix L of convergence factors to be applied the observer estimates and forwards the result to adder 504 as another input. Model estimate output vector $\hat{x}$, or at least the angular frequency model estimate $\omega_{est}$ component of that vector, is forwarded to error correction function 460 implemented by microcontroller 200 as shown in the functional architecture shown in FIG. 4.

As noted above, the implementation of FIG. 5 derives model estimate output vector $\hat{x}$ by solving the system of the electrical and mechanical equations for motor 100, for the current measured values of motor voltage and coil current. The output of adder 504 is a time derivative $\hat{x}$ of that solution from the sum of its addends. Based on the above description and matrix equations (3a) through (3d), the time derivative $\hat{x}$ output by adder 504 can be expressed as:

$$\dot{\hat{x}} = \frac{d}{dt}\begin{bmatrix} \omega \\ I \end{bmatrix} = \begin{bmatrix} \frac{-B_f}{J} & \frac{k_t}{J} \\ \frac{-k_t}{L_a} & \frac{-R_a}{L_a} \end{bmatrix}\begin{bmatrix} \omega \\ I_a \end{bmatrix} + \begin{bmatrix} 0 \\ 1/L_a \end{bmatrix}MV \quad (4)$$

Integration of this vector $$\frac{d}{dt}\begin{bmatrix} \omega \\ I \end{bmatrix}$$

over time by integration operator 506 will thus yield the model estimate output vector $\hat{x}$:

$$\hat{x} = \begin{bmatrix} \omega_{est} \\ I_a \end{bmatrix} \quad (3a)$$

As described above, the angular frequency model estimate $\omega_{est}$ component from model estimate output vector $\hat{x}$ is forwarded to error correction function 460, and the coil current component $I_a$ is removed from vector $\hat{x}$ by C operator 520 and applied to the negative input of adder 522 for development of the error signal y_error.

As noted above, the implementation of FIG. 5 represents the operation of observer function 450 realized in the continuous-time domain. Observer function 450 may alternatively be realized in the discrete-time domain, for example when implemented by digital logic such as in microcontroller 200. As described above with respect to FIG. 2, microcontroller 200 includes comparator module 240 and ADC module 228, which digitizes the feedback coil current signal I_COIL and feedback motor voltage signal MV into discrete time sequences. Additional processing to incorporate discrete-time related compensation blocks (e.g., backward Euler or Bilinear transforms) in the transfer function of observer function will be required in such discrete-time realizations. With the inclusion of the appropriate transforms, this realization of observer function 450 in the discrete-time domain can solve a system of equations including an electrical model and a mechanical model for motor 100 similarly as in the continuous-time example described above relative to FIG. 5. According to this example embodiment, observer function 450 may be realized as either a continuous-time observer or a discrete-time observer, depending on the particular implementation.

Figure 6:
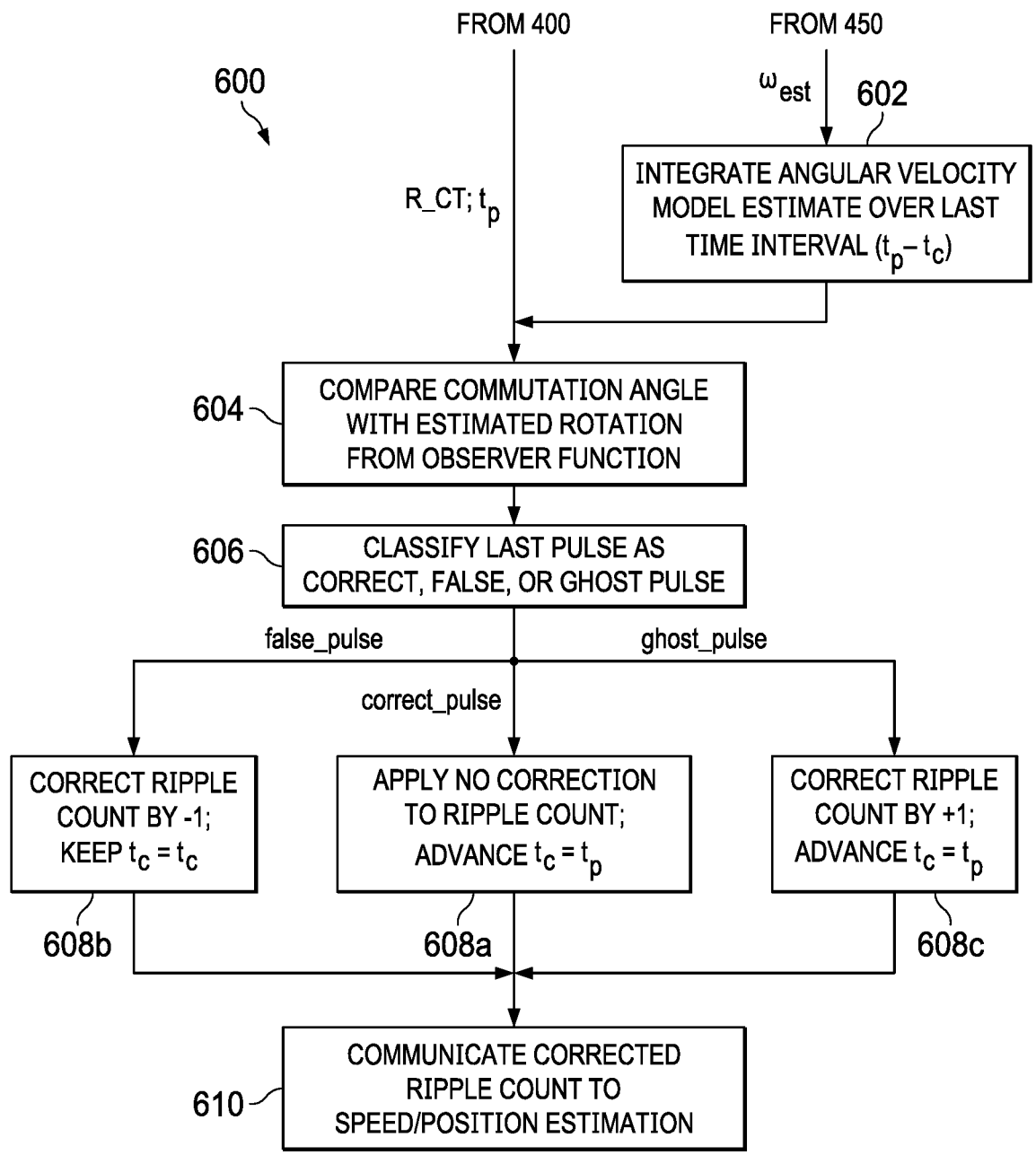
FIG. 6 is a flow diagram illustrating the operation of an error correction function in the functional architecture of FIG. 4 according to an example embodiment.

Referring now to FIG. 6, error correction process 600 as performed by error correction function 460 of FIG. 4 according to an example embodiment will now be described. According to this example embodiment, ripple counter 400 issues a pulse upon detection of a discontinuity in coil current I_COIL, and advances a cumulative ripple count, and communicates advanced cumulative ripple count value as signal R_CT to error correction function 460. For example, as illustrated in FIG. 3B, a timestamp indicating a time $t_p$ at which ripple counter 400 detected the discontinuity and issued a discontinuity pulse 380 may be forwarded to error correction function 460 along with the advanced ripple count R_CT. Alternatively, error correction function 460 may apply the timestamp for time $t_p$ on its receipt of the updated ripple count R_CT from ripple counter 400.

Error correction function 460 in the meanwhile will have received one or more angular frequency model estimates $\omega_{est}$ from observer function 450 since a time $t_c$ of the last previous pulse 380 from ripple counter 400 (an example of which is also shown in FIG. 3B). This time $t_c$ may be stored in RAM 224 or another memory resource accessible to error correction function 460 as executed by CPU 250. In process 602, error correction function 460 performs an integration of angular frequency model estimate $\omega_{est}$ as estimated by observer function 450 over the time interval between time $t_c$ of the previous pulse and time $t_p$ of the pulse from the newly detected discontinuity. The result of integration process 602 will be an estimate of the angular rotation of the rotor of motor 100 over the time interval $t_p$–$t_c$ between the previous and current pulses.

In process 604, error correction function 460 compares the estimated angular rotation of motor 100 from integration process 602 with the commutation angle indicated by the advanced ripple count detected by ripple counter 400. Because the number of poles of motor 100 is known and fixed, the occurrence of a commutation as reflected in a coil current discontinuity theoretically indicates rotation of the rotor by a fixed angle (e.g., for a four-pole motor, the angle between commutations is 90°; for an eight-pole motor, the commutation angle is 45°, and so on). In general, comparison process 604 performed by error correction function 460 compares this commutation angle with the estimated angular rotation from process 602 to determine whether the rotation detected by ripple counter 400 is expected, based on the electrical and mechanical models applied by observer function 450 for the applied coil current and motor voltage. For example, this comparison may be performed by observing the time interval between time $t_c$ of the previous pulse and time $t_p$ of the newly detected pulse and determining whether the commutation angle movement of motor 100 matches the estimated angular rotation from integration process 602 over that same time interval. This comparison of the commutation angle may be made relative to the estimated angular rotation plus or minus a selected margin, to allow for the effects of acceleration or deceleration of motor 100, and for variations or imprecision in the motor as compared to the parameters applied to observer function 450. This margin may be programmable to allow the user to tighten or relax the classification operation as desired in a specific implementation.

Based on the result of comparison process 604, classification process 606 may be performed by error correction function 460 to classify the newly detected discontinuity pulse into one of three categories: a correct pulse; a false pulse; or a ghost pulse. According to this approach, classification process 606 classifies the newly detected pulse as a correct pulse if the estimated angular rotation matches the commutation angle of the motor (within the selected margin), classifies the newly detected pulse as a false pulse if the estimated angular rotation is less than the commutation angle, and classifies the newly detected pulse as a ghost pulse if the estimated angular rotation is greater than the commutation angle, such that an intervening pulse in addition to the newly detected pulse would be expected within the time interval between time $t_c$ of the previous pulse and time $t_p$ of the newly detected pulse. Based on the result of classification process 606, error correction function 460 generates a corrected ripple count value and communicates this corrected ripple count via signal CR_CT to speed/position estimation function 480 in this example embodiment.

For the case in which classification process 606 classifies the newly detected pulse as a correct pulse, error correction function 460 executes process 608a to apply no correction to ripple count R_CT in generating corrected ripple count signal CR_CT. Also in process 608a for the case of a correct pulse, previous pulse time $t_c$ is updated with the time $t_p$ of the newly detected pulse, in preparation for the next detected discontinuity pulse in a next instance of process 602.

For the case in which classification process 606 classifies the newly detected pulse as a false pulse, error correction function 460 executes process 608b in the example embodiment of FIG. 6. Because the newly detected false pulse is counted in the ripple count R_CT as communicated to error correction function 460, this false pulse error is corrected in process 608b by subtracting one from the ripple count R_CT in generating the corrected ripple count CR_CT to speed/position estimation function 480. Because the newly detected pulse was a false pulse, the previous pulse time $t_c$ is not updated in process 608b to the time $t_p$ of the newly detected pulse but remains at its previous value.

Figure 7A:
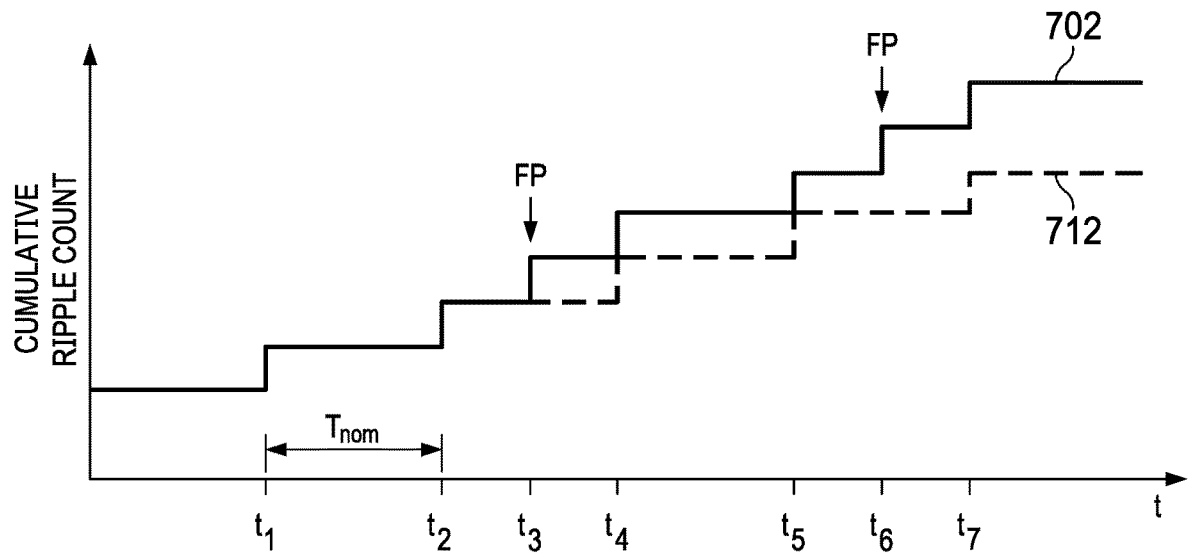
FIG. 7A and FIG. 7B are plots of ripple count illustrating the operation of the error correction function of FIG. 6 for the cases of false pulses and ghost pulses, respectively, according to an example embodiment.

FIG. 7A illustrates an example of the operation of error correction function 460 during the operation of motor 100 in the case in which false pulses are intermittently detected by ripple counter 400. For the sake of simplicity, the angular velocity of motor 100 in this example is substantially constant, and as such the commutation pulses are expected to be periodic with a substantially constant period $T_{nom}$. Plot 702 in FIG. 7A corresponds to an uncorrected cumulative ripple count (e.g., ripple count R_CT) as generated by ripple counter 400, while plot 712 corresponds to a corrected cumulative ripple count (e.g., corrected ripple count CR_CT). At time $t_2$ in FIG. 7A, the uncorrected ripple count of plot 702 advances by one. Accordingly, time $t_p$=$t_2$ and the previous pulse time $t_c$=$t_1$. In this example, error correction function 460 classifies the pulse at time $t_2$ as a correct pulse in classification process 606, and makes no correction to the ripple count R_CT in generating corrected ripple count CR_CT, as shown by the coincidence of plots 702 and 712 in the example of FIG. 7A. Previous pulse time $t_c$ is updated to the time $t_2$ of this correct pulse.

At time $t_3$, ripple counter 400 has detected another discontinuity pulse, and advanced its ripple count R_CT by one as shown by plot 702. However, this pulse at time $t_3$ is classified as a false pulse (FP) by error correction function 460 in classification process 606. In process 608b in this example, error correction function 460 corrects the ripple count R_CT by subtracting one in its generation of corrected ripple count CR_CT. This correction is shown in FIG. 7A by the dashed line of plot 712 remaining at its previous value at time $t_3$. Previous pulse time $t_c$ is not updated to time $t_3$ in this instance of process 608b, because the detected pulse at time $t_3$ was determined to be a false pulse, so time $t_c$ remains at its current value (i.e., $t_c$=$t_2$). In this example of FIG. 7A, another pulse is detected by ripple counter 400 and ripple count R_CT is advanced at time $t_4$. This pulse at time $t_4$ is classified by error correction function 460 as a correct pulse, and in this instance of process 608a, corrected ripple count CR_CT is advanced by one and previous pulse time $t_c$ is updated to time $t_4$. Operation continues in this manner from pulse to pulse, with another correct pulse detected at time $t_5$. Another false pulse FP is detected at time $t_6$, in response to which the corrected ripple count CR_CT is not advanced, as shown by plot 712 at time $t_6$.

Referring back to FIG. 6, for the case in which classification process 606 classifies the newly detected pulse as a ghost pulse, error correction function 460 executes process 608c. In this case, in addition to the newly detected commutation pulse at time $t_p$, another pulse should have been previously detected since the time $t_c$ of the last detected pulse, such that the ripple count R_CT is lower (by one) than it ought to be, according to the estimated angular rotation from process 602. In process 608c, this ghost pulse error is corrected by adding an additional pulse (+1) to ripple count R_CT in generating corrected ripple count CR_CT communicated to speed/position estimation function 480. Because the newly detected pulse is a correct pulse, the previous pulse time $t_c$ is updated in process 608c to the time $t_p$ of the newly detected pulse.

Figure 7B:
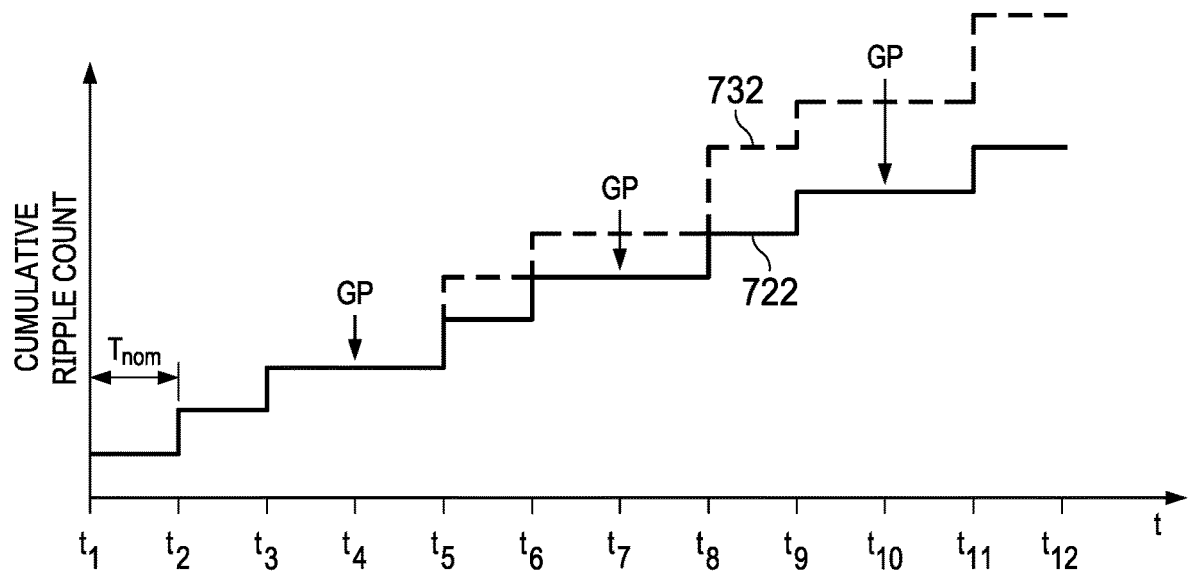

FIG. 7B illustrates an example of the operation of error correction function 460 during the operation of motor 100 in the case in which ghost pulses are detected by ripple counter 400. In this example, the angular velocity of motor 100 is again substantially constant, and as such commutation pulses are expected to be periodic at a substantially constant period $T_{nom}$. Plot 722 in FIG. 7B corresponds to an uncorrected cumulative ripple count R_CT as generated by ripple counter 400, while plot 732 corresponds to corrected cumulative ripple count CR_CT as generated by error correction function 460. In this example, uncorrected cumulative ripple count plot 722 and corrected cumulative ripple count plot 732 are initially at the same value at time $t_1$. At time $t_2$ in FIG. 7B, the uncorrected ripple count of plot 722 advances by one to indicate a commutation pulse. Error correction function 460 classifies the pulse at time $t_2$ as a correct pulse in classification process 606, and thus makes no correction to the ripple count R_CT as it advances corrected ripple count CR_CT to count this correct pulse. Previous pulse time $t_c$ is updated to time $t_2$ of this correct pulse. Similarly, a commutation pulse occurs at time $t_3$ as indicated by the advancing of uncorrected ripple count of plot 722. This pulse is also classified as a correct pulse by error correction function 460, and the corrected ripple count is advanced with no correction applied as shown by plot 732 at time $t_3$. Previous pulse time $t_c$ is updated to time $t_3$ of this correct pulse. Because no correction is applied by error correction function 460 at either of times $t_2$ and $t_3$, plots 722 and 732 remain at the same value through time $t_3$ in the example of FIG. 7B.

In this example, ripple counter 400 detects the next discontinuity pulse and advances its ripple count R_CT at time $t_5$, as shown by plot 722. In this case, however, error correction function 460 determines, in comparison process 604 and classification process 606, that another pulse (ghost pulse GP) should have occurred but was not detected prior to the pulse corresponding to time $t_5$ because the estimated angular rotation from observer function 450 is greater than the commutation angle of a single pulse at time $t_p=t_5$ following time $t_c=t_3$. Accordingly, the uncorrected ripple count R_CT at time $t_5$ has undercounted commutation pulses by one. In process 608c, therefore, error correction function 460 adds a correction of +1 to the uncorrected ripple count R_CT to account for the ghost pulse GP that should have been detected at about time $t_4$ but was not. This correction is shown in FIG. 7B by the dashed line of plot 732 advancing by two at time $t_5$ (+1 for the newly detected pulse at time $t_5$, and a correction of +1). Previous pulse time $t_c$ is updated to time $t_5$ of the newly detected pulse.

This operation continues, in this example of FIG. 7B, with error correction function 460 classifying correct pulses at times $t_6$ and $t_9$ and detecting ghost pulses GP that should have occurred between time $t_6$ and time $t_8$ and between time $t_9$ and time $t_{11}$. The corrected ripple count CR_CT includes corrections of an additional +1 in the ripple count at times $t_8$ and $t_{11}$, as shown by plot 732 of FIG. 7B.

In process 610, error correction function 460 communicates corrected ripple count signal CR_CT to speed/position estimation function 480. The corrected ripple count signal CR_CT may be communicated to and processed by speed/position estimation function 480 after each instance of a detected coil current discontinuity, or at such time or periodicity as appropriate for the motor control system. In this example embodiment, speed/position estimation function 480 in microcontroller 200 uses this corrected ripple count signal CR_CT to estimate the current rotational speed, rotational position, or both of motor 100 for use as feedback in controlling the drive of motor 100.

Figure 8:
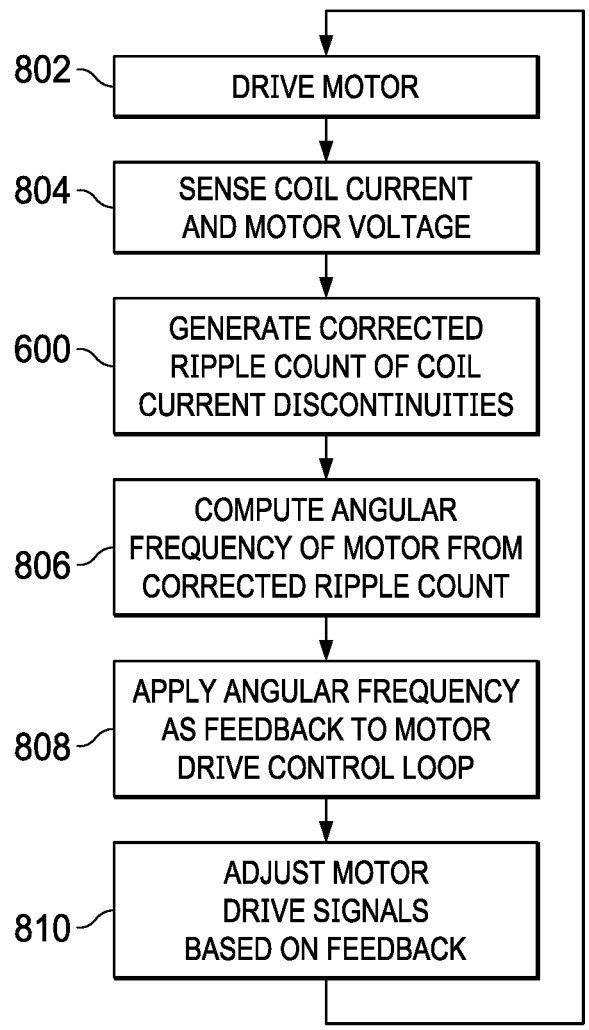
FIG. 8 is a flow diagram illustrating the operation of motor control incorporating the error correction operation of FIG. 6 according to an example embodiment.

The generation of a corrected ripple count as described may be implemented into a motor control system such as illustrated in FIG. 1A and operating according to a control loop such as illustrated in FIG. 1B, according to example embodiments. FIG. 8 illustrates a flow chart of an example of a method incorporating the generation of a corrected ripple count into such a motor control system and control loop, according to an example embodiment as will now be described.

In process 802 of FIG. 8, motor driver 112 drives motor 100 according to control signals produced by microcontroller 200 in response to an input signal corresponding to a desired speed or position, in combination with feedback corresponding to the current speed or position of motor 100 as described above. While motor 100 is being driven in process 802, current values of coil current and motor voltage at motor 100 are sensed and communicated to digital logic 110, for example via coil current signal I_COIL from current sense circuitry 116 and motor voltage signal MV acquired from lines MV+, MV−. Process 600, for example as described above relative to FIG. 4 through FIG. 6, is then performed by digital logic 110 to detect and count coil current discontinuities and correct that ripple count based on observer function 450 applying a model for motor 100 to the sensed coil current and motor voltage. The corrected ripple count (e.g., signal CR_CT from error correction function 460 in FIG. 4) is applied to speed/position estimation function 480, which computes an angular frequency (or rotational position, or both) from that corrected ripple count in process 806. That computed angular frequency (or position) is applied as feedback in the motor drive control loop such as described above relative to FIG. 1B in process 808. In process 810, that feedback is combined with the motor speed (or position) input to adjust the drive signals currently applied to motor 100 in process 802, and the motor control process continues.

According to these example embodiments, improvements in the measurement of the speed and position of a rotating BDC motor are enabled, without requiring the costly and bulky implementation of encoder-based speed sensors. Experimentation has shown that the combination of ripple counting with the estimation of angular rotation by a model-based observer function has exhibited improved accuracy over either approach used individually. For example, in one experiment, the error in the uncorrected ripple count over 5000 commutations (as counted by an encoder) was observed to be 1.8%, while the error in the corrected ripple count generated according to an example embodiment was observed to be approximately 0.04% over 5000 commutations. This improvement is made available, by example embodiments, in a form that can be readily implemented into an integrated circuit solution.

As apparent from the foregoing description, the model constants applied by observer function 450 in its generation of angular velocity model estimate $\omega_{est}$ correspond to various parameters of motor 100, such as the back emf constant $k_t$, resistance $R_a$ and inductance $L_a$ of the armature coil of motor 100, rotor friction constant $B_f$, inertia constant J, and possibly other motor parameters. As noted above, in some embodiments the values of these motor parameters may be derived during the actual operation of motor 100, for example by iteratively updating initial values (e.g., specification values, or characterized values) of the motor parameters during an initial time interval of each operation of motor 100.

Figure 9:
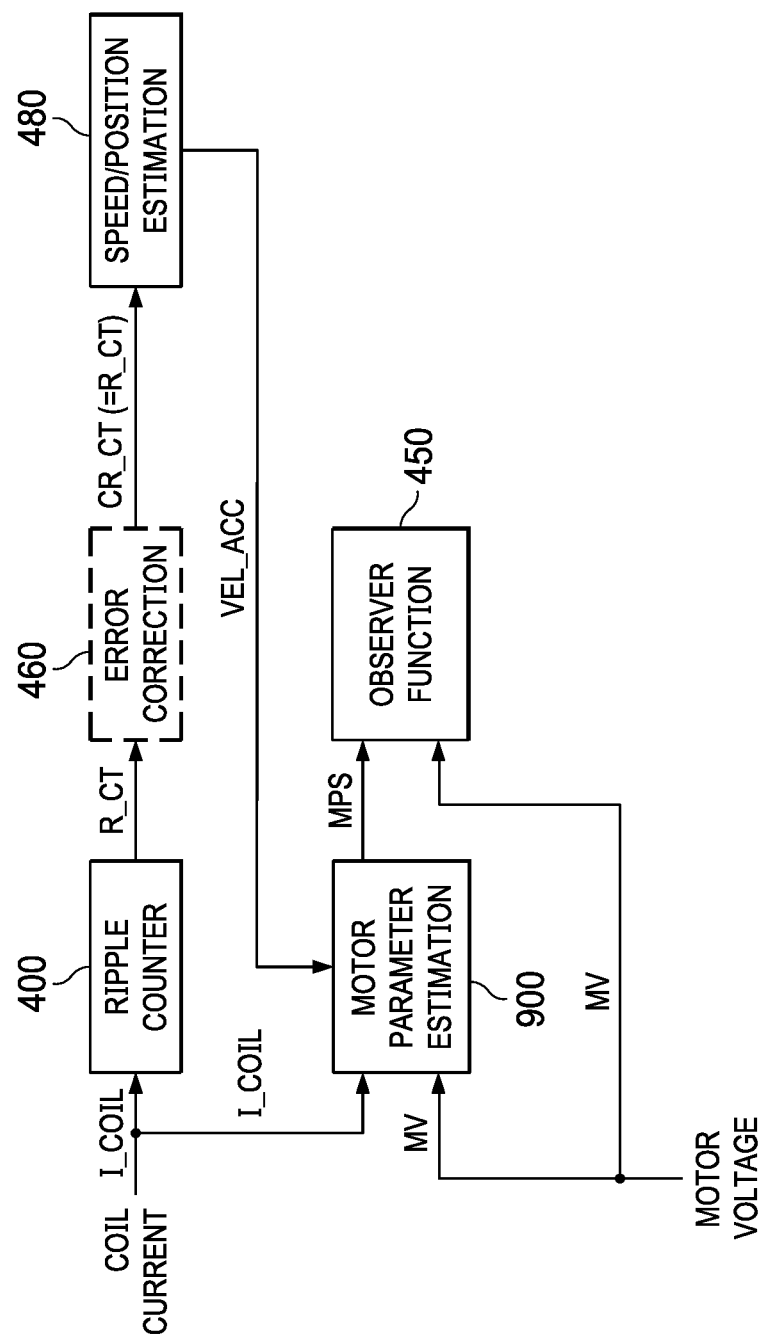
FIG. 9 is a block diagram of the functional architecture of the microcontroller of FIG. 2 in estimating motor parameters in an initial estimation time interval following startup according to an example embodiment.

FIG. 9 illustrates an example architecture of the functional architecture of digital logic, such as microcontroller 200 of FIG. 2, in the estimation of motor parameters for use by observer function 450 in applying real-time correction as described above. In this example embodiment, as noted above, the estimation of these motor parameters is performed during an initial time interval in the operation of motor 100, prior to such time as error correction function 460 applies real-time correction to the raw ripple count R_CT as output by ripple counter 460.

During the initial estimation period illustrated in FIG. 9, motor parameter estimation function 900 is provided to adaptively generate the model constants, or motor parameters, to be used by observer function 450 in controlling error correction function 460 to apply real-time correction to the ripple count. According to this example embodiment, motor parameter estimation function 900 receives a coil current signal I_COIL, for example from current sense circuitry 116 based on an input from sensor 115 deployed at motor 100 (FIG. 1A), with that coil current signal I_COIL representing the current applied to the coil of motor 100. Motor parameter estimation function 900 also receives, from speed/position estimation function 480, an estimate signal VEL_ACC providing an estimate of the angular frequency (or velocity) of motor 100, and in some implementations the acceleration of motor 100, either instead of or in addition to the angular frequency. Based on these inputs of coil current, speed, and acceleration, motor parameter estimation function 900 applies the appropriate calculations to derive estimates of the various motor parameters based on the response of motor 100 (e.g., its angular frequency, the time rate of change of its angular frequency) to the applied coil current. For purposes of these example embodiments, any one of a number of estimation approaches, including for example an adaptive or recursive algorithm, a heuristic optimization algorithm, a regression or statistical approach, or the like, may be suitable for the estimation of these motor parameters. As shown in FIG. 9, the estimated motor parameters are applied by motor parameter estimation function 900 on lines MPS to observer function 450 for its use in the real-time correction of ripple count as described above.

However, during this initial estimation period while the motor parameters are being derived by motor parameter estimation function 900, observer function 450 is not operable to generate an angular frequency model estimate $\omega_{est}$ for correcting ripple count R_CT from ripple counter 400. As a result, errors in the ripple count R_CT that are due to ghost pulses or false pulses will not be corrected during this estimation period, and the ripple count CR_CT applied to speed/position function 480 is simply the raw ripple count R_CT generated by ripple counter 400.

Figure 10:
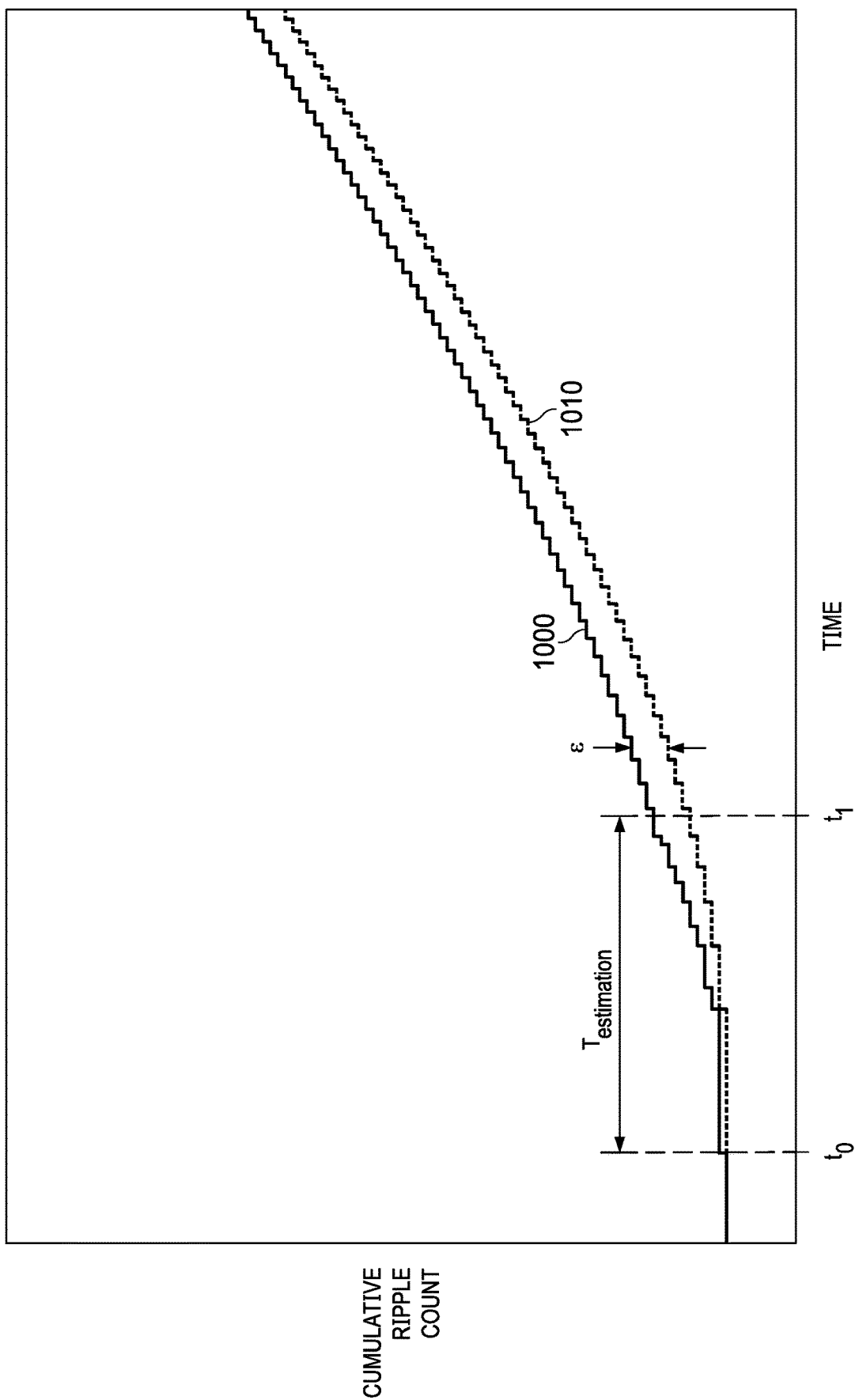
FIG. 10 is a plot of cumulative ripple count illustrating the presence of ripple count error during the initial estimation time interval following startup.

FIG. 10 illustrates the effect of the lack of ripple count correction during this estimation period in a motor control system including a microcontroller 200 with the functional architecture shown in FIG. 9. Curve 1000 in FIG. 10 illustrates the cumulative corrected ripple count CR_CT as issued to speed/position estimation function 480 from startup of motor 100 at time $t_0$. At startup time $t_0$, observer function 450 does not yet have the necessary motor parameters to derive an angular frequency model estimate $\omega_{est}$ for use in ripple count error correction; these motor parameters are estimated during an estimation interval $T_{estimation}$ following startup time $t_0$ in this implementation. During this estimation interval $T_{estimation}$, errors in ripple count R_CT due to ghost and false pulses are not corrected by error correction function 460, and the ripple count CR_CT applied to speed/position function 480 is the raw ripple count R_CT generated by ripple counter 400. Upon the completion of motor parameter estimation function 900 estimation interval $T_{estimation}$ at time $t_1$, the motor parameters MPS are forwarded to observer function 450 and real-time correction of ghost and false pulses in ripple count R_CT can be applied.

Because errors in the ripple count R_CT are not corrected during the estimation period $T_{estimation}$, though, the presence of false or ghost pulses can cause an error in the cumulative ripple count relative to its "true" count. In the example of FIG. 10, curve 1000 of the ripple count CR_CT as issued to speed/position estimation function 480 includes several false pulses that are not corrected during estimation interval $T_{estimate}$. As a result, the cumulative ripple count of curve 1000 at time $t_1$ is higher than its true count (in this example by not counting the false pulses) shown by curve 1010. After time $t_1$ at which observer function 450 receives the estimated motor parameters from motor parameter estimation function 900, real-time error correction is then applied, such that the increasing cumulative corrected ripple count shown by curve 1000 matches that of the true count shown by curve 1010. However, a fixed error ε from the uncorrected false pulses during estimation time $T_{estimation}$ will remain in the cumulative count of curve 1000 over its operation. This fixed error ε will affect determinations of the absolute position of motor 100 from the cumulative ripple count.

Figure 11:
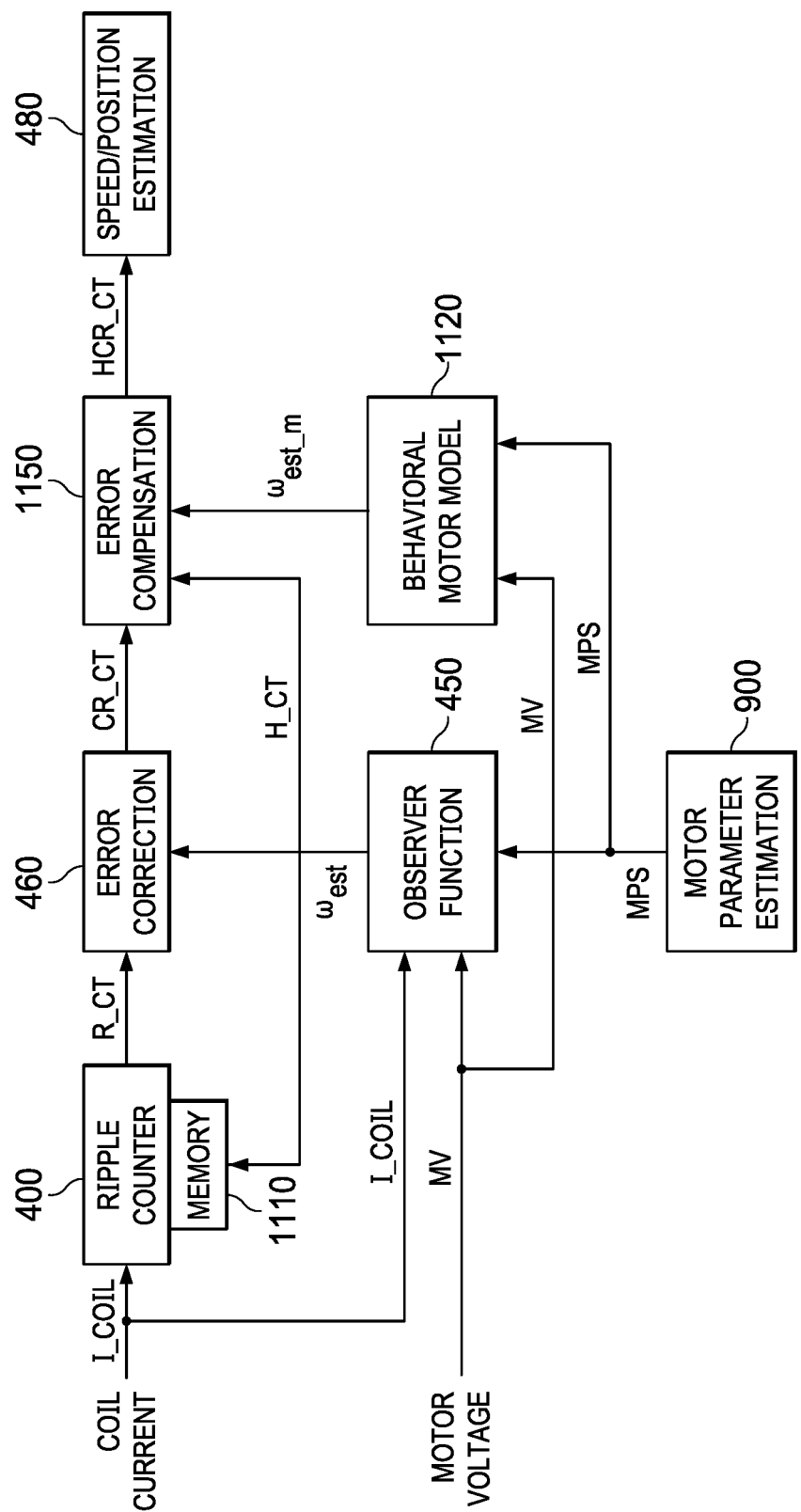
FIG. 11 is a block diagram of the functional architecture of the microcontroller of FIG. 2 in correcting ripple count and compensating for cumulative ripple count error following an initial estimation time interval according to an example embodiment.

Correction of this fixed error ε is important in those motor control applications in which precise knowledge of the absolute position of the motor is necessary. FIG. 11 illustrates a functional architecture of digital logic 110 in the motor control system of FIG. 1A, configured and operable to correct historical fixed error ε due to under-correction of false and ghost pulses during the time $T_{estimation}$ required after startup to estimate parameters of motor 100 according to example embodiments. In this example, digital logic 110 is realized as microcontroller 200 (FIG. 2), in which case these operations will be carried out by and under the direction and control of CPU 250 in combination with other functions in microcontroller 200. For example, CPU 250 may carry out and control these operations by executing program instructions stored in machine-readable form in the memory resources of the system, such as ROM 226 and in some implementations RAM 224. Alternatively or in addition, some or all of the operations described herein may be executed by special-purpose or dedicated logic circuitry realizing part or all of digital logic 110 in the motor control system.

Similarly as described above in connection with the architecture of FIG. 4, ripple counter 400 receives coil current I_COIL from motor 100, and is operable to detect and count discontinuities in that current from the commutation of motor 100 during rotation, generating ripple count R_CT that is applied to error correction function 460. In this implementation, ripple counter 400 is also associated with memory 1110, which stores a cumulative ripple count H_CT, for example as counted by ripple counter 400 during the estimation time interval $T_{estimation}$. For example, ripple count R_CT generated by ripple counter 400 may correspond to a cumulative ripple count beginning at startup of motor 100. In this case, ripple counter 400 may store the cumulative ripple count H_CT as of the end of the estimation interval $T_{estimation}$, for example in response to a signal indicating that motor parameter estimation function 900 has completed its estimation.

As in the architecture of FIG. 4, coil current I_COIL is also provided to observer function 450, along with motor voltage MV from motor 100. As described above, observer function 450 derives an angular frequency model estimate $\omega_{est}$ based on the motor parameters MPS generated by motor parameter estimation function 900 in the estimation interval $T_{estimation}$ as described above relative to FIG. 9. This angular frequency model estimate $\omega_{est}$ is applied to error correction function 460 for the detection and correction of false and ghost pulses in ripple count R_CT, resulting in corrected ripple count signal CR_CT for use in estimating the current motor speed and position.

According to this example embodiment, behavioral motor model function 1120 has inputs receiving motor parameters MPS from motor parameter estimation function 900 and the motor voltage MV from motor 100. Behavioral motor model function 1120 is configured and operable to calculate motor speed and position for motor 100 according to a behavioral model for a motor having the parameters estimated by function 900 and in response to motor voltage MV over the duration of estimation time $T_{estimation}$. The output of behavioral motor model function 1120 is an historical angular frequency model estimate $\omega_{est\_m}$. This estimate $\omega_{est\_m}$ is applied to an input of error compensation function 1150, which also has an input receiving a stored cumulative ripple count H_CT from memory 1110 of ripple counter 400 and an input receiving the current real-time corrected ripple count CR_CT from error correction function 460.

According to this example embodiment, the historical angular frequency model estimate $\omega_{est\_m}$ indicates the position of motor 100 in response to motor voltage MV if motor 100 were operating according to the motor parameters MPS estimated by function 900. To the extent that the actual cumulative ripple count H_CT produced by ripple counter 400 and stored in memory 1110 differs from an estimated angular position based on this historical angular frequency model estimate $\omega_{est\_m}$, that difference, which corresponds to the fixed error ε of FIG. 10, may be considered as due to the presence of false or ghost pulses in the ripple count as detected by ripple counter 400. Error compensation function 1150 is configured and operable to adjust the cumulative corrected ripple count CR_CT by an amount corresponding to the difference between an estimated angular position based on the historical angular frequency model estimate $\omega_{est\_m}$ and the actual cumulative ripple count H_CT produced by ripple counter 400 and stored in memory 1110. For example, error compensation function 1150 may compute an integration of the historical angular frequency model estimate $\omega_{est\_m}$ to derive an estimated angular position over the estimation time interval (e.g., $T_{estimation}$), and compare that estimated angular position with the actual cumulative ripple count H_CT to arrive at a ripple count adjustment for the cumulative corrected ripple count CR_CT. The resulting corrected and compensated ripple count HCR_CT as determined by error compensation function 1150 is applied to speed/position estimation function 480, for determination of the current speed or position, or both, of motor 100.

Figure 12:
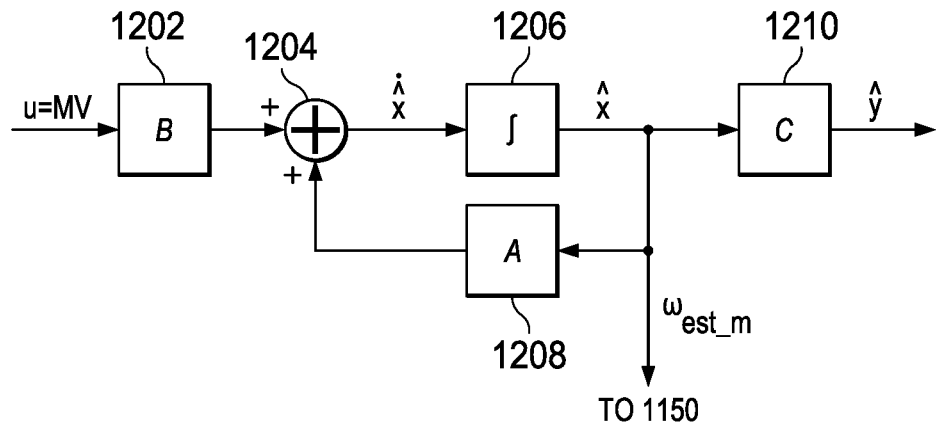
FIG. 12 is a block diagram illustrating the operation of a behavioral motor model in the functional architecture of FIG. 9 according to an example embodiment.

The behavioral motor model applied by behavioral motor model function 1120 in this example embodiment may differ from that applied by observer function 450. An example of a behavioral motor model as used by function 1120 in an implementation is illustrated in FIG. 12. This example implementation of FIG. 12 is arranged to derive an output vector $\hat{x}$ representing historical angular frequency model estimate $\omega_{est\_m}$:

$$\hat{x} = \begin{bmatrix} \omega_{est\_m} \\ I_a \end{bmatrix} \quad (5a)$$

To arrive at this model estimate output vector $\hat{x}$, the implementation of FIG. 12 includes B operator 1202 which multiplies its input u, which in this case is a scalar corresponding to the input of motor voltage MV as sensed and digitized by ADC 228 of microcontroller 200, by a matrix B:

$$B = \begin{bmatrix} 0 \\ 1/L_a \end{bmatrix} \quad (5b)$$

where $L_a$ represents the coil inductance of motor 100. The output of operator 1202 (e.g., the product of input u by the B operator) is applied as one input to adder 1204. As will be described below, adder 1204 generates an estimate vector that is the time derivative $\dot{x}$ of model estimate output vector $\hat{x}$. That time derivative vector is applied to integrator 1206, which integrates the time derivative to produce model estimate output vector x. Model estimate output vector $\hat{x}$ is applied as feedback to A operator 1208, which multiplies vector $\hat{x}$ by:

$$A = \begin{bmatrix} -B_f/J & k_t/J \\ -k_t/L_a & -R_a/L_a \end{bmatrix} \quad (5c)$$

The output of operator 1208 is another input to adder 1204. Model estimate output vector $\hat{x}$ may also be applied to C operator 1210, which multiplies vector $\hat{x}$ by:

$$C = [0 \ 1] \quad (5d)$$

to retrieve coil current estimate $I_a$ from vector $\hat{x}$. Model estimate output vector $\hat{x}$, or at least the historical angular frequency model estimate $\omega_{est\_m}$ component of that vector, is forwarded to error compensation function 1150 implemented by microcontroller 200 as shown in the functional architecture shown in FIG. 11.

The implementation of FIG. 12 represents the operation of behavioral motor model function 1120 as realized in the continuous-time domain. Behavioral motor model function 1120 may alternatively be realized in the discrete-time domain, for example when implemented by digital logic such as in microcontroller 200. As described above with respect to FIG. 2, microcontroller 200 includes comparator module 240 and ADC module 228, which digitizes the feedback motor voltage signal MV into discrete time sequences. Additional processing to incorporate discrete-time related compensation blocks (e.g., backward Euler or Bilinear transforms) in the transfer function of the behavioral motor model function will be useful in such discrete-time realizations. According to this example embodiment, behavioral motor model function 1120 may be realized as either a continuous-time or discrete-time motor model function, depending on the particular implementation.

Figure 13:
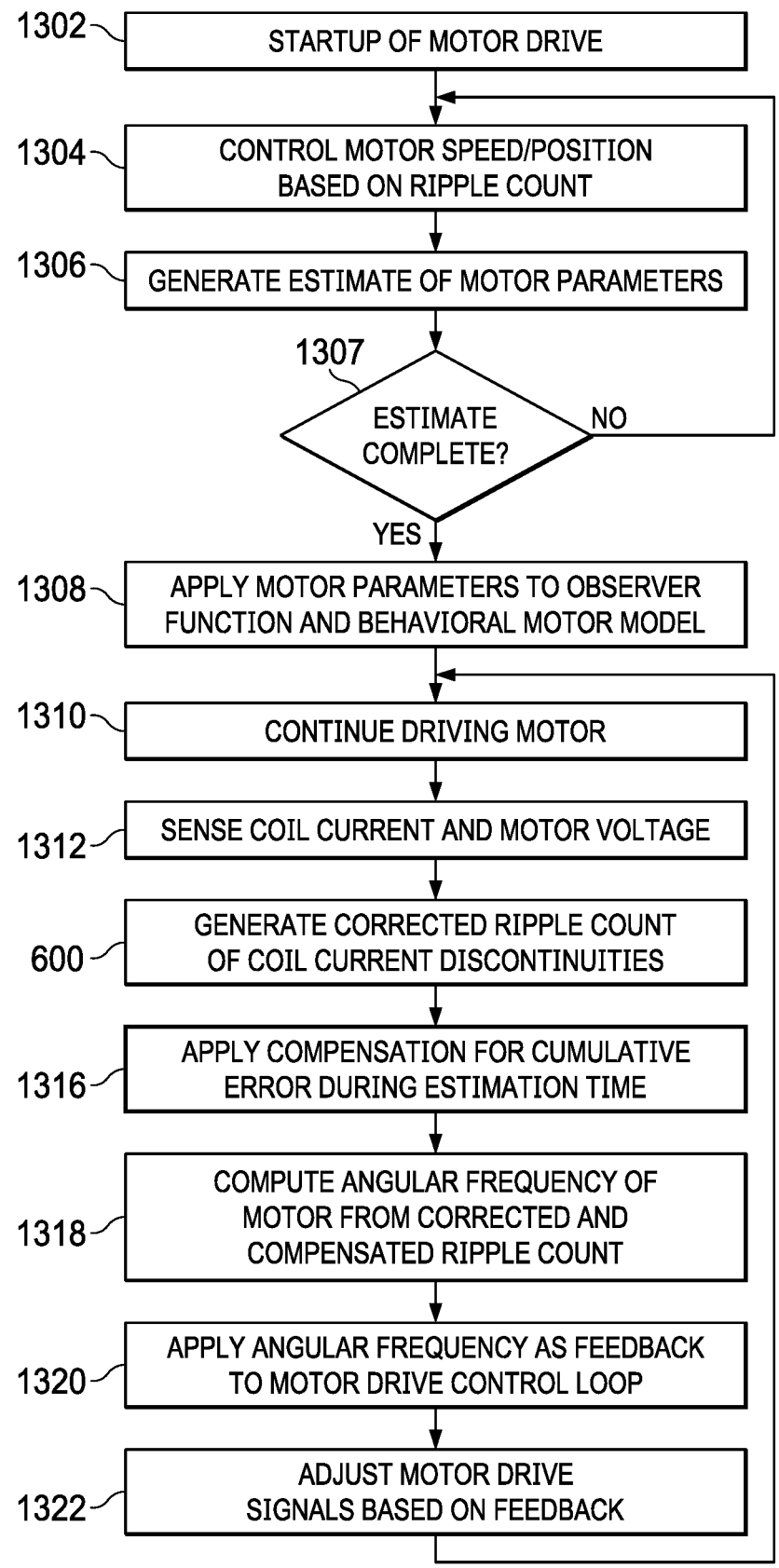
FIG. 13 is a flow diagram illustrating the operation of motor control incorporating an initial error compensation operation according to an example embodiment.

The generation of a corrected ripple count, including compensation for historical errors in a cumulative ripple count that may arise during estimation of motor parameters as described above, may be implemented into a motor control system such as illustrated in FIG. 1A and operating according to a control loop such as illustrated in FIG. 1B, according to example embodiments. FIG. 13 illustrates a flow chart of an example of a method incorporating the generation of a corrected ripple count into such a motor control system and control loop, according to an example embodiment as will now be described.

The method of motor control according to this example embodiment begins with process 1302, in which the drive of motor 100 by motor driver 112 starts. As motor driver 112 drives motor 100 after startup, control of the motor drive is effected in process 1304 by control signals produced by microcontroller 200 in response to an input signal corresponding to a desired speed or position, in combination with feedback corresponding to the current speed or position of motor 100 as measured by ripple counter 400. At this initial stage of operation after startup, motor parameters have not yet been estimated by motor parameter estimation function 900, and as such, the control applied in process 1304 is based on the raw ripple count R_CT from ripple counter 400 without correction for false and ghost pulses as described above. In process 1306, motor parameter estimation function 900 begins determining the motor parameters for this instance of motor 100 under its current conditions, while motor 100 is continuing to be driven by motor driver 112 (decision 1307 is "no"). Upon completion of the estimation of the motor parameters (decision 1307 is "yes"), these motor parameters are communicated to observer function 450 and behavioral motor model 1120 in process 1308, and motor driver 112 continues to drive motor 100 in process 1310.

Once the motor parameters have been estimated and applied to observer function 450, the raw ripple count R_CT may be corrected. During the driving of motor 100 in process 1310, current values of coil current and motor voltage at motor 100 are sensed and communicated to observer function 450, and digital logic 110 performs an instance of process 600, for example as described above relative to FIG. 4 through FIG. 6, to detect and count coil current discontinuities and correct that ripple count based on a model, applied by observer function 450, corresponding to the estimated motor parameters to the sensed coil current and motor voltage.

In process 1316, behavioral motor model function 1120 meanwhile generates historical angular frequency model estimate $\omega_{est\_m}$ based on the motor voltage MV and the motor parameters estimated in process 1306, and applies that estimate $\omega_{est\_m}$ to compensation function 1150. Error compensation function 1150 compensates the corrected ripple count (e.g., signal CR_CT from error correction function 460 in FIG. 11) according to a difference between an estimated angular position based on this historical angular frequency model estimate $\omega_{est\_m}$ and a historical cumulative ripple count H_CT stored in memory 1110 from ripple counter 400, as described above.

Figure 14:
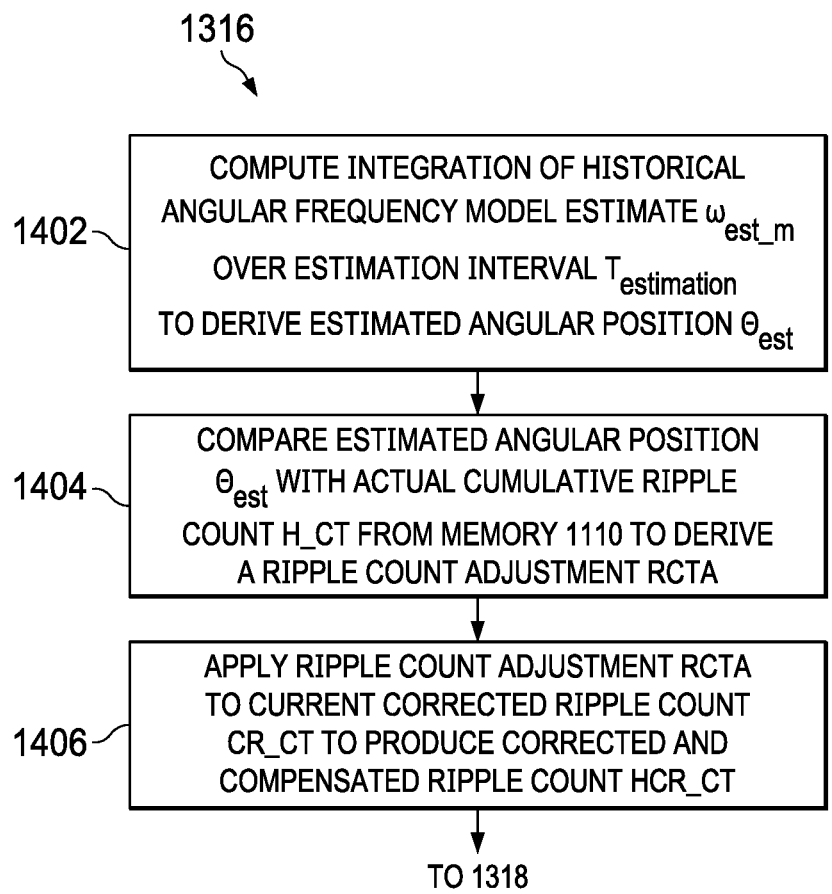
FIG. 14 is a flow diagram illustrating the operation of applying a compensation for cumulative error over an estimation time interval according to an example embodiment.

FIG. 14 illustrates an example of operations performed by error compensation function 1150 in compensating the corrected ripple count in process 1316 based on the historical angular frequency model estimate $\omega_{est\_m}$ from behavioral motor model function 1120. In this example, process 1316 may include the computing of an integration of the historical angular frequency model estimate $\omega_{est\_m}$ to derive an estimated angular position $\Theta_{est}$ over the estimation time interval (e.g., $T_{estimation}$) in process 1402. This estimated angular position $\Theta_{est}$ may be generated or converted into terms of a ripple count, given the commutation angle (e.g., number of poles) of motor 100. In process 1404, error compensation function 1150 compares that estimated angular position $\Theta_{est}$ with the actual cumulative ripple count H_CT, for example by subtracting the two values, to arrive at a ripple count adjustment RCTA corresponding to the difference in the compared values. The ripple count adjustment RCTA may be either a positive or a negative value, depending on whether errors in the actual cumulative ripple count H_CT are due to ghost pulses or false pulses, respectively. In process 1406, that ripple count adjustment RCTA is applied to the current corrected ripple count CR_CT from error correction function 460 to produce corrected and compensated ripple count HCR_CT. In an example implementation, this ripple count adjustment RCTA is applied gradually, or incrementally, so maintain relatively smooth operation of motor 100 as the ripple count is compensated.

Figure 15:
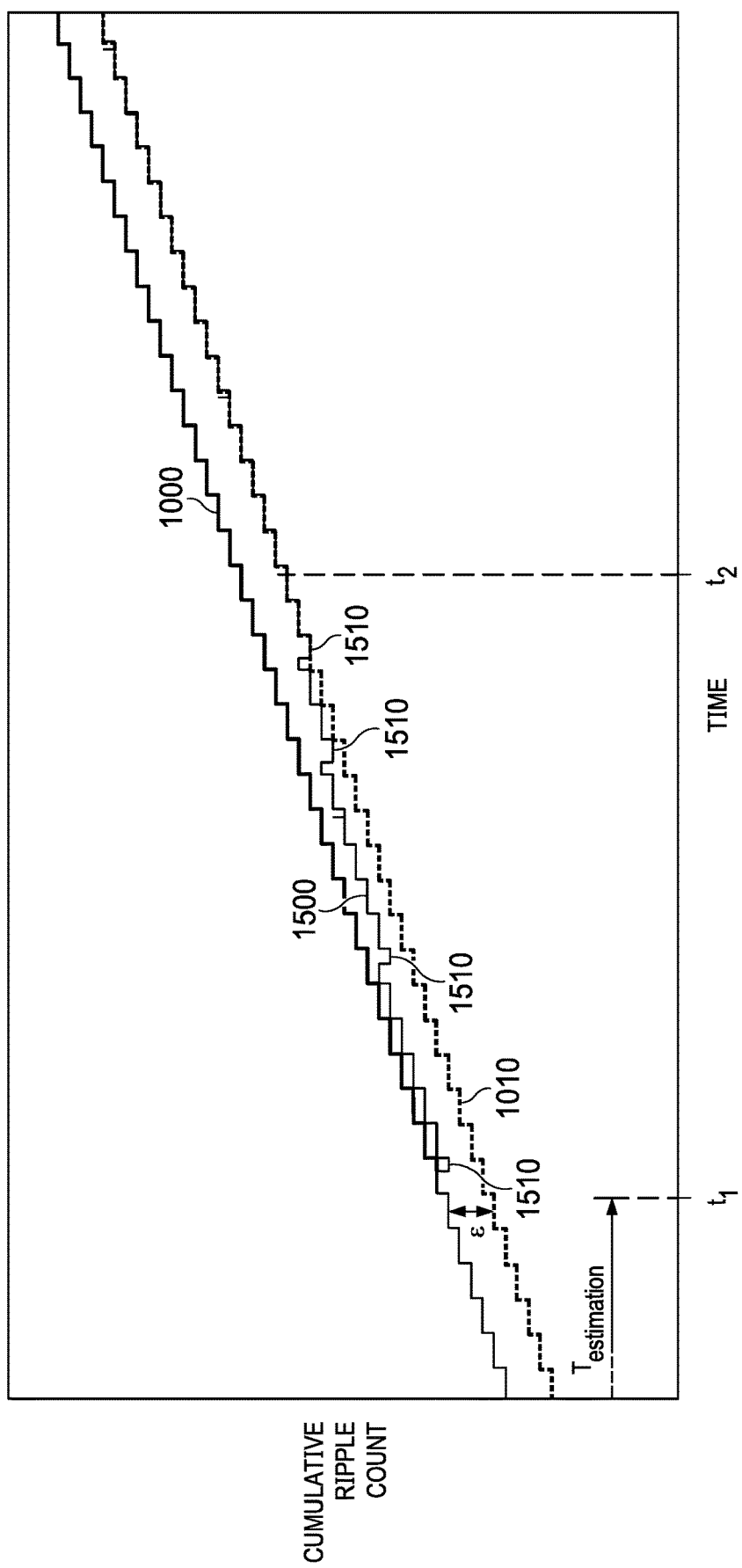
FIG. 15 is a plot of cumulative ripple count and its compensation according to an example embodiment to correct historical error in the initial estimation time interval following startup.

FIG. 15 illustrates an example of the operation of compensation process 1406 according to this incremental approach. FIG. 15 includes curve 1000 from FIG. 10, which represents the cumulative corrected ripple count CR_CT, and also includes curve 1010 from FIG. 10, which represents the true ripple count (in this example, not counting the false pulses present in curve 1000). As discussed above relative to FIG. 10, during an initial time interval $T_{estimation}$ (the terminal end $t_1$ of which is shown in FIG. 15), estimates of motor parameters are not yet available to observer function 450 in this example, and thus errors in ripple count R_CT due to ghost and false pulses are not corrected by error correction function 460. In the example of FIG. 15, several false pulses have been counted during estimation time $T_{estimation}$ in the count reflected by curve 1000, as reflected as a historical error ε between curve 1000 and the true ripple count of curve 1010. In this example embodiment, once the motor parameters are derived and applied to behavioral motor model 1120, this historical error ε can be compensated by the ripple count adjustment RCTA derived in process 1404 according to this example embodiment. In this example, this ripple count adjustment RCTA is applied incrementally over time in process 1406 in the form of multiple adjustments (e.g., each adjusting the count by one ripple) applied to cumulative corrected ripple count CR_CT. As shown in FIG. 15, curve 1500 illustrates the resulting corrected and compensated ripple count HCR_CT as it is developed after estimation time $T_{estimation}$ by the incremental application of single pulse adjustments 1510 in this process 1406. In this case in which four false pulses occurred during estimation time $T_{estimation}$, the application of four separate single-pulse adjustments 1510 results in the full compensation of corrected and compensated ripple count HCR_CT, shown by curve 1500, to match the true ripple count (curve 1010) at and after time $t_2$.

Alternatively, the ripple count adjustment RCTA derived in operation 1404 may be applied in process 1406 by a single adjustment (e.g., a single ripple count adjustment of four pulses).

Referring back to FIG. 13, this resulting corrected and compensated ripple count HCR_CT is then used by speed/position estimation function 480 in process 1318 to compute an angular rotation from that corrected and compensated ripple count. The computed angular rotation is applied as feedback in the motor drive control loop such as described above relative to FIG. 1B, in process 1320. This feedback is combined with the motor speed or position input to adjust the drive signals currently applied to motor 100 in process 1322, and the motor control process continues.

In motor control implementations in which the motor parameters are estimated during an initial time interval following motor startup, a behavioral motor model can be used to derive a model-based estimate of rotation during this estimation time. Error compensation may be applied, based on this angular rotation estimate, to a stored cumulative ripple count over that estimation time to compensate for false and ghost pulse errors in the ripple count that may have been detected and counted. In automotive and industrial applications in which the accurate position of BDC motor is very critical and error is not acceptable, this error compensation method obtained through post-processing offers advantage over conventional implementations.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device, or other electronics or semiconductor component.

Unless otherwise stated, "about," "approximately," or "substantially" preceding a value means +/−10 percent of the stated value. Modifications are possible in the described examples, and other examples are possible within the scope of the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party. While, in some example embodiments, certain elements are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. To the extent that it is not shown in the figures or discussed above, similar features in the figures (whether they have the same or different reference numbers) may be connected in the same manner as they are connected in other figures, even if they are not explicitly shown to include those connections in a particular figure. As used herein, functional blocks ("functions") and/or circuitry may be implemented using digital circuitry, analog circuitry, a processor, a microcomputer, a state machine, memory, software, firmware and/or any combination of the above.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

While one or more embodiments have been described in this specification, it is of course contemplated that modifications of, and alternatives to, these embodiments, such modifications and alternatives capable of obtaining one or more of the technical effects of these embodiments, will be apparent to those of ordinary skill in the art having reference to this specification and its drawings. It is contemplated that such modifications and alternatives are within the scope of the claims presented herein.

What is claimed is:

1. A motor control method, comprising:
   starting a brushed direct current (BDC) motor by applying electrical drive to the motor;
   in an initial time interval following the starting of the motor, detecting discontinuities in a coil current;
   during the initial time interval, generating an estimate of one or more motor parameters;
   generating an historical angular frequency model estimate based on the estimated motor parameters;
   determining an angular frequency model estimate responsive to coil current and motor voltage sensed at the motor;
   generating a corrected ripple count based on the angular frequency model estimate;
   compensating the corrected ripple count based on the historical angular frequency model estimate; and
   adjusting the electrical drive applied to the motor responsive to the compensated corrected ripple count.

2. The method of claim 1, wherein the compensating step comprises:
   storing a value of the ripple count at the end of the initial time interval;
   computing an integration of the historical angular frequency model estimate to derive an estimated angular position of the motor;
   determining a difference between the estimated angular position and the stored value of the ripple count; and
   compensating the corrected ripple count according to the difference.

3. The method of claim 1, wherein the motor parameters comprise one or more of a back emf constant $k_f$, a resistance $R_a$ of an armature coil of the motor, an inductance $L_a$ of the armature coil, a rotor friction constant $B_f$, and an inertia constant J.

4. The method of claim 3, wherein the step of generating an estimate of the one or more motor parameters comprises:
   iteratively updating initial values of the one or more motor parameters during the initial time interval responsive to a motor voltage at the motor and to one or more of an angular velocity and acceleration of the motor.

5. The method of claim 4, wherein the step of generating an estimate of the one or more motor parameters further comprises:

determining the one or more of the angular velocity and acceleration of the motor based on the ripple count of the detected discontinuities.

6. A motor control system, comprising:
a motor driver having an output for coupling to a brushed direct current (BDC) motor; and
motor control circuitry having an input for receiving a coil current signal and a motor voltage signal from the motor and having an output coupled to the motor driver, the motor control circuitry configured to generate a motor drive signal at its output comprising:
starting the motor by generating the motor drive signal to the motor driver;
in an initial time interval following the starting of the motor, detecting and counting discontinuities in the coil current signal to produce a ripple count;
during the initial time interval, generating an estimate of one or more motor parameters;
generating an historical angular frequency model estimate;
determining an angular frequency model estimate responsive to the coil current signal and motor voltage signal;
generating a corrected ripple count responsive to a comparison of a commutation angle of the motor with an angular position based on the angular frequency model estimate;
compensating the corrected ripple count according to the historical angular frequency model estimate; and
adjusting the motor drive signal responsive to the compensated corrected ripple count.

7. The system of claim 6, further comprising:
a current sensor at the motor; and
current sense circuitry coupled to the current sensor.

8. The system of claim 6, further comprising:
a memory;
wherein the operation of compensating the corrected ripple count comprises:
storing a value of the ripple count at the end of the initial time interval in the memory;
computing an integration of the historical angular frequency model estimate to derive an estimated angular position of the motor;
determining a difference between the estimated angular position and the stored value of the ripple count; and
compensating the corrected ripple count according to the difference.

9. The system of claim 6, wherein the motor parameters comprise one or more of a back emf constant $k_t$, a resistance $R_a$ of an armature coil of the motor, an inductance $L_a$ of the armature coil, a rotor friction constant $B_f$, and an inertia constant J.

10. The system of claim 9, wherein the operation of generating an estimate of the one or more motor parameters comprises:
iteratively updating initial values of the one or more motor parameters during the initial time interval responsive to the motor voltage signal and to one or more of an angular velocity and acceleration of the motor.

11. The system of claim 10, wherein the operation of generating an estimate of the one or more motor parameters further comprises:
determining the one or more of the angular velocity and acceleration of the motor based on the ripple count of the detected discontinuities.

12. The system of claim 6, wherein the motor control circuitry comprises digital logic.

13. The system of claim 12, further comprising:
a current sensor; and
current sense circuitry, for generating the coil current signal responsive to the coil current sensed at the motor;
and wherein the digital logic comprises a comparator coupled to the current sense circuitry to receive the coil current signal.

14. Motor control circuitry configured to generate a motor drive signal at an output comprising:
starting the generating of the motor drive signal;
receiving, at one or more inputs, a coil current signal and a motor voltage signal from a brushed direct current (BDC) motor;
in an initial time interval following the starting of the motor, detecting discontinuities in a coil current sensed at the motor to produce a ripple count of the detected discontinuities;
during the initial time interval, generating an estimate of one or more motor parameters responsive to the motor voltage signal and to one or more of an angular velocity and acceleration of the motor;
generating an historical angular frequency model estimate from a behavioral motor model incorporating the estimated motor parameters;
after the generating of the estimate of the motor parameters and while applying electrical drive to the motor, determining an angular frequency model estimate responsive to the coil current signal and the motor voltage signal, using a computational model for the motor incorporating the estimated motor parameters;
generating a corrected ripple count responsive to a comparison of a commutation angle of the motor with an angular position based on the angular frequency model estimate;
compensating the corrected ripple count based on the historical angular frequency model estimate; and
adjusting the motor drive signal responsive to the compensated corrected ripple count.

15. The motor control circuitry of claim 14, further comprising:
a memory;
wherein the operation of compensating the corrected ripple count comprises:
storing a value of the ripple count at the end of the initial time interval in the memory;
computing an integration of the historical angular frequency model estimate to derive an estimated angular position of the motor;
determining a difference between the estimated angular position and the stored value of the ripple count; and
compensating the corrected ripple count according to the difference.

16. The motor control circuitry of claim 14, wherein the motor parameters comprise one or more of a back emf constant $k_t$, a resistance $R_a$ of an armature coil of the motor, an inductance $L_a$ of the armature coil, a rotor friction constant $B_f$, and an inertia constant J.

17. The motor control circuitry of claim 16, wherein the operation of generating an estimate of the one or more motor parameters comprises:
iteratively updating initial values of the one or more motor parameters during the initial time interval responsive to the motor voltage signal and to one or more of an angular velocity and acceleration of the motor.

18. The motor control circuitry of claim 14, wherein the operation of generating an estimate of the one or more motor parameters further comprises:
   determining the one or more of the angular velocity and acceleration of the motor based on the ripple count of the detected discontinuities.

19. The motor control circuitry of claim 14, comprising a microcontroller, the microcontroller comprising:
   a central processing unit;
   one or more ports coupled to one or more inputs, outputs, or input/outputs; and
   memory storing contents comprising executable program instructions that, when executed by the central processing unit, cause the motor control circuitry to perform the starting receiving, detecting, generating, determining, generating, compensating, and adjusting operations.

* * * * *